(12) United States Patent
Cho et al.

(10) Patent No.: US 10,551,676 B2
(45) Date of Patent: Feb. 4, 2020

(54) DISPLAY APPARATUS

(71) Applicant: Samsung Display Co., Ltd., Yongin-Si, Gyeonggi-Do (KR)

(72) Inventors: Seon-ah Cho, Gwangmyeong-si (KR); Kyunghwan Jeon, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 156 days.

(21) Appl. No.: 15/827,243

(22) Filed: Nov. 30, 2017

(65) Prior Publication Data

US 2018/0157086 A1 Jun. 7, 2018

(30) Foreign Application Priority Data

Dec. 2, 2016 (KR) .................. 10-2016-0163820

(51) Int. Cl.
*G02F 1/1335* (2006.01)
*G02F 1/13363* (2006.01)
*G02F 1/13357* (2006.01)

(52) U.S. Cl.
CPC .... *G02F 1/13363* (2013.01); *G02F 1/133512* (2013.01); *G02F 1/133528* (2013.01); *G02F 1/133536* (2013.01); *G02F 1/133553* (2013.01); *G02F 1/1336* (2013.01); *G02F 1/133514* (2013.01); *G02F 2001/133531* (2013.01); *G02F 2001/133548* (2013.01); *G02F 2001/133614* (2013.01); *G02F 2001/133631* (2013.01); *G02F 2001/133633* (2013.01); *G02F 2001/133638* (2013.01); *G02F 2202/36* (2013.01); *G02F 2413/02* (2013.01); *G02F 2413/06* (2013.01)

(58) Field of Classification Search
None
See application file for complete search history.

(56) References Cited

U.S. PATENT DOCUMENTS

| | | | |
|---|---|---|---|
| 9,164,353 B2 | 10/2015 | Jeon et al. | |
| 9,354,463 B2 | 5/2016 | Park et al. | |
| 9,400,345 B2 | 7/2016 | Iida et al. | |
| 2013/0242228 A1* | 9/2013 | Park | G02F 1/133617 349/61 |
| 2018/0019238 A1* | 1/2018 | Kim | H01L 51/0002 |

FOREIGN PATENT DOCUMENTS

| | | |
|---|---|---|
| KR | 1020150125197 A | 11/2009 |
| KR | 101383551 B1 | 4/2014 |
| KR | 1020150000743 A | 1/2015 |
| KR | 1020160092172 A | 8/2016 |
| KR | 1020160102323 A | 8/2016 |

* cited by examiner

*Primary Examiner* — Edward J Glick
*Assistant Examiner* — Anthony G Quash
(74) *Attorney, Agent, or Firm* — Cantor Colburn LLP

(57) ABSTRACT

A display apparatus includes an optical member disposed on a display panel. The optical member includes a linear polarizer and a λ/4 phase retarder overlapping with green and red pixel areas and not overlapping with a blue pixel area.

20 Claims, 13 Drawing Sheets

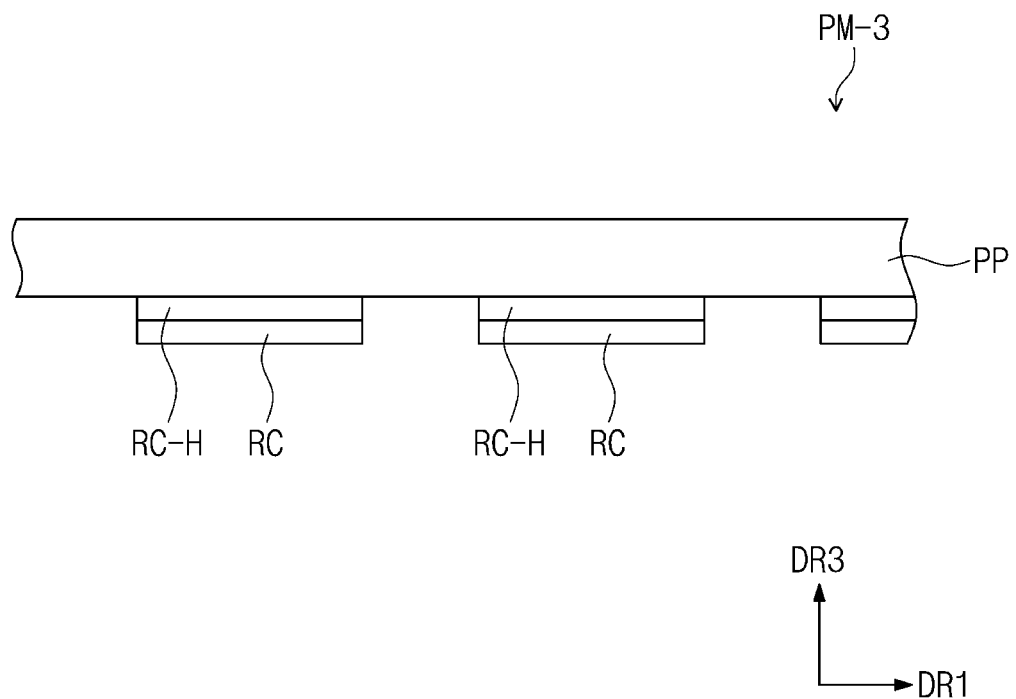

DISPLAY APPARATUS

This application claims priority to Korean Patent Application No. 10-2016-0163820, filed on Dec. 2, 2016, and all the benefits accruing therefrom under 35 U.S.C. § 119, the content of which in its entirety is herein incorporated by reference.

BACKGROUND

1. Field

Exemplary embodiments of the invention relate to a display apparatus. More particularly, exemplary embodiments of the invention relate to a display apparatus that includes an optical member preventing reflection by external light.

2. Description of the Related Art

Various display apparatuses used in multimedia devices such as televisions, portable phones, tablet computers, navigation systems, and game consoles have been developed. In addition, photo-luminescent liquid crystal displays increasing light efficiency and improving color balance have been developed.

SUMMARY

When the various display apparatuses are used in an outdoor environment rich in external light, the external light may be reflected and/or scattered at display surfaces of the display apparatuses. A polarizing member including a polarizer and a phase retardation layer combined with each other is used to solve or prevent the deterioration of the display quality.

Exemplary embodiments of the invention are directed to a display apparatus capable of improving display quality by reducing a difference in reflectance of external light between pixel areas.

According to an exemplary embodiment, a display apparatus includes a light source unit which provides blue light, a display panel disposed on the light source unit and which includes a blue pixel area, a green pixel area, and a red pixel area, and an optical member disposed on the display panel. The display panel includes a first substrate, a second substrate which faces the first substrate and is closer to the light source unit than the first substrate, a liquid crystal layer disposed between the first substrate and the second substrate, a first polarizing layer disposed between the first substrate and the liquid crystal layer, a second polarizing layer which faces the first polarizing layer and being closer to the light source unit than the first polarizing layer, a color conversion layer disposed between the first substrate and the first polarizing layer, and a reflective layer disposed between the color conversion layer and the first polarizing layer. The optical member includes a linear polarizer, and a $\lambda/4$ phase retarder disposed between the linear polarizer and the first substrate, and which overlaps with the green pixel area and the red pixel area, and does not overlap with the blue pixel area in a plan view.

In an exemplary embodiment, the reflective layer may overlap with the green pixel area and the red pixel area and may not overlap with the blue pixel area.

In an exemplary embodiment, the color conversion layer may include a first conversion part disposed on the blue pixel area and which transmits the blue light, a second conversion part disposed on the green pixel area and which includes a first illuminant which absorbs the blue light and emits green light, and a third conversion part disposed on the red pixel area and which includes a second illuminant which absorbs the blue light and emits red light.

In an exemplary embodiment, the first illuminant and the second illuminant may include at least one of a fluorescent substance and a quantum dot.

In an exemplary embodiment, a particle size of the first illuminant may be different from a particle size of the second illuminant.

In an exemplary embodiment, the first to third conversion parts may be spaced apart from each other in the plan view, and the color conversion layer may further include a light shielding part disposed between the first to third conversion parts.

In an exemplary embodiment, the display panel may further include an optical filter layer disposed between the second conversion part and the first substrate and between the third conversion part and the first substrate.

In an exemplary embodiment, the optical member may further include a support layer disposed between the linear polarizer and the $\lambda/4$ phase retarder.

In an exemplary embodiment, the optical member may further include a $\lambda/2$ phase retarder disposed between the linear polarizer and the $\lambda/4$ phase retarder.

In an exemplary embodiment, the first polarizing layer may be a reflective polarizer that transmits light polarized in a first direction and reflects light polarized in a second direction perpendicular to the first direction.

In an exemplary embodiment, the first polarizing layer may be a wire grid polarizer.

In an exemplary embodiment, the linear polarizer may have a transmission axis parallel to the first direction.

In an exemplary embodiment, the optical member may further include a zero phase retarder disposed adjacent to the $\lambda/4$ phase retarder in the plan view and which overlaps with the blue pixel area.

In an exemplary embodiment, the optical member may further include a support layer disposed between the linear polarizer and the $\lambda/4$ phase retarder and between the linear polarizer and the zero phase retarder.

In an exemplary embodiment, the second polarizing layer may be disposed on a top surface or a bottom surface of the second substrate.

In an exemplary embodiment, the $\lambda/4$ phase retarder may be a liquid crystal coating layer.

According to an exemplary embodiment, a display apparatus includes a light source unit, a display panel disposed on the light source unit and which includes a blue pixel area, a green pixel area, and a red pixel area, and an optical member disposed on the display panel. The display panel includes a first substrate, a second substrate which faces the first substrate and is closer to the light source unit than the first substrate, a liquid crystal layer disposed between the first substrate and the second substrate, a first polarizing layer disposed between the first substrate and the liquid crystal layer, a second polarizing layer which faces the first polarizing layer and is closer to the light source unit than the first polarizing layer, a color conversion layer disposed between the first substrate and the first polarizing layer, and a reflective layer disposed between the color conversion layer and the first polarizing layer. The optical member includes a patterned phase retarder, and a linear polarizer disposed on the patterned phase retarder. The patterned phase retarder includes a first phase retardation part which overlaps with the green pixel area and the red pixel area, does not overlap with the blue pixel area in a plan view, and has a phase retardation value of λ/4, and a second phase retardation part which overlaps with the blue pixel area, does not overlap with the green pixel area and the red pixel area, and has a phase retardation value of zero.

In an exemplary embodiment, the reflective layer may overlap with the green pixel area and the red pixel area and may not overlap with the blue pixel area, and the reflective layer may reflect green light and red light.

In an exemplary embodiment, the first polarizing layer may be a reflective polarizer which transmits light polarized in a first direction and reflects light polarized in a second direction perpendicular to the first direction.

According to an exemplary embodiment, a display apparatus includes a light source unit, a display panel disposed on the light source unit and which includes a first pixel area, a second pixel area and a third pixel area which emit light of different wavelengths from each other, and an optical member disposed on the display panel. The display panel includes a first substrate, a second substrate which faces the first substrate and is closer to the light source unit than the first substrate, a liquid crystal layer disposed between the first substrate and the second substrate, a first polarizing layer disposed between the first substrate and the liquid crystal layer, a second polarizing layer which faces the first polarizing layer and is closer to the light source unit than the first polarizing layer, a color conversion layer disposed between the first substrate and the first polarizing layer, and a reflective layer which is disposed between the color conversion layer and the first polarizing layer, overlaps with the second and third pixel areas, and does not overlap with the first pixel area in a plan view. The optical member includes a linear polarizer, a λ/4 phase retarder which is disposed between the linear polarizer and the first substrate, overlaps with the reflective layer, and does not overlap with the first pixel area, and a zero phase retarder which is disposed between the linear polarizer and the first substrate and does not overlap with the reflective layer.

BRIEF DESCRIPTION OF THE DRAWINGS

The above and other aspects and features of the invention will become more apparent by describing in further detail exemplary embodiments thereof with reference to the accompanying drawings, in which:

FIGS. 7A to 7C are cross-sectional views illustrating exemplary embodiments of an optical member included in a display apparatus according to the invention.

DETAILED DESCRIPTION

Figure 1:
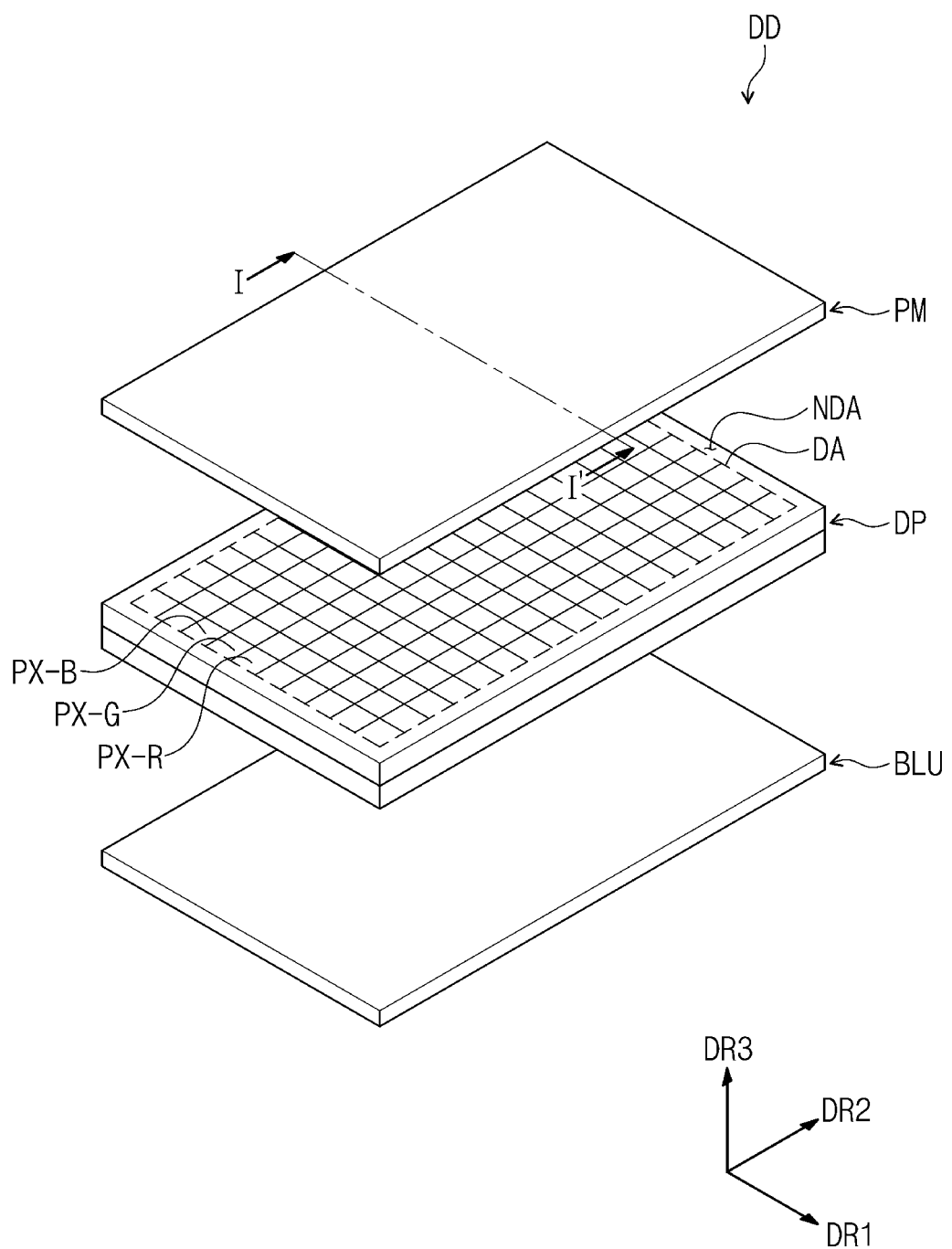
FIG. 1 is an exploded perspective view illustrating a display apparatus according to an exemplary embodiment of the invention.

The invention now will be described more fully hereinafter with reference to the accompanying drawings, in which various exemplary embodiments are shown. This invention may, however, be embodied in many different forms, and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

In the present disclosure, when a layer, a film, a region, a plate, etc. is referred to as being "on" or "above" another part, it can be "directly on" the other part, or intervening layers may also be present. On the contrary, it will be understood that when a layer, a film, a region, a plate, etc. is referred to as being "under" or "beneath" another part, it can be "directly under", and one or more intervening layers may also be present. In contrast, the term "directly" means that there are no intervening elements. In addition, it will also be understood that when a plate is referred to as being disposed "above" another part, it can be disposed above or beneath another part.

As used herein, the term "and/or" includes any and all combinations of one or more of the associated listed items. The terminology used herein is for the purpose of describing particular exemplary embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

Figure 2:
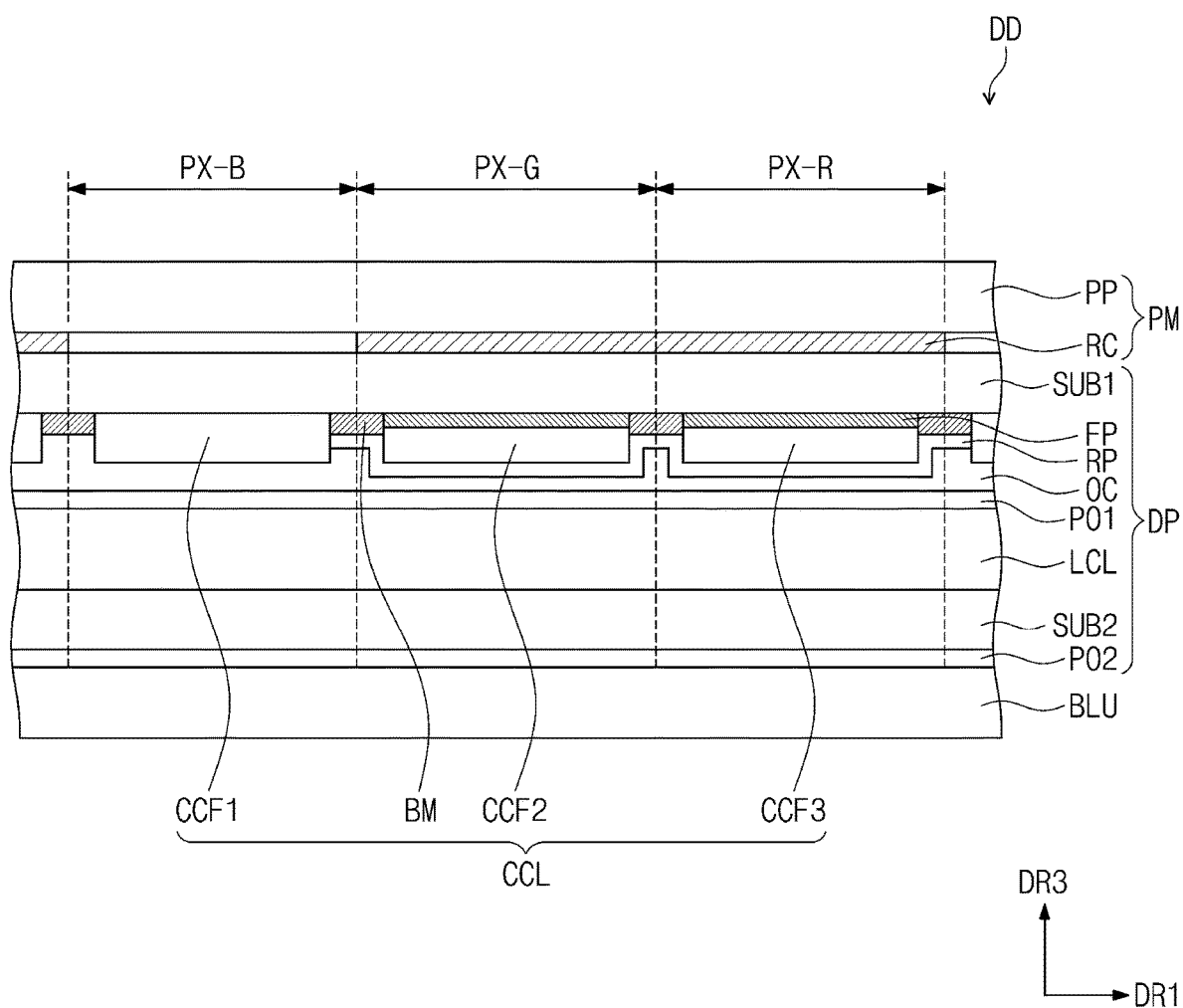
FIG. 2 is a cross-sectional view corresponding to a line I-I' of FIG. 1.
Figure 3:
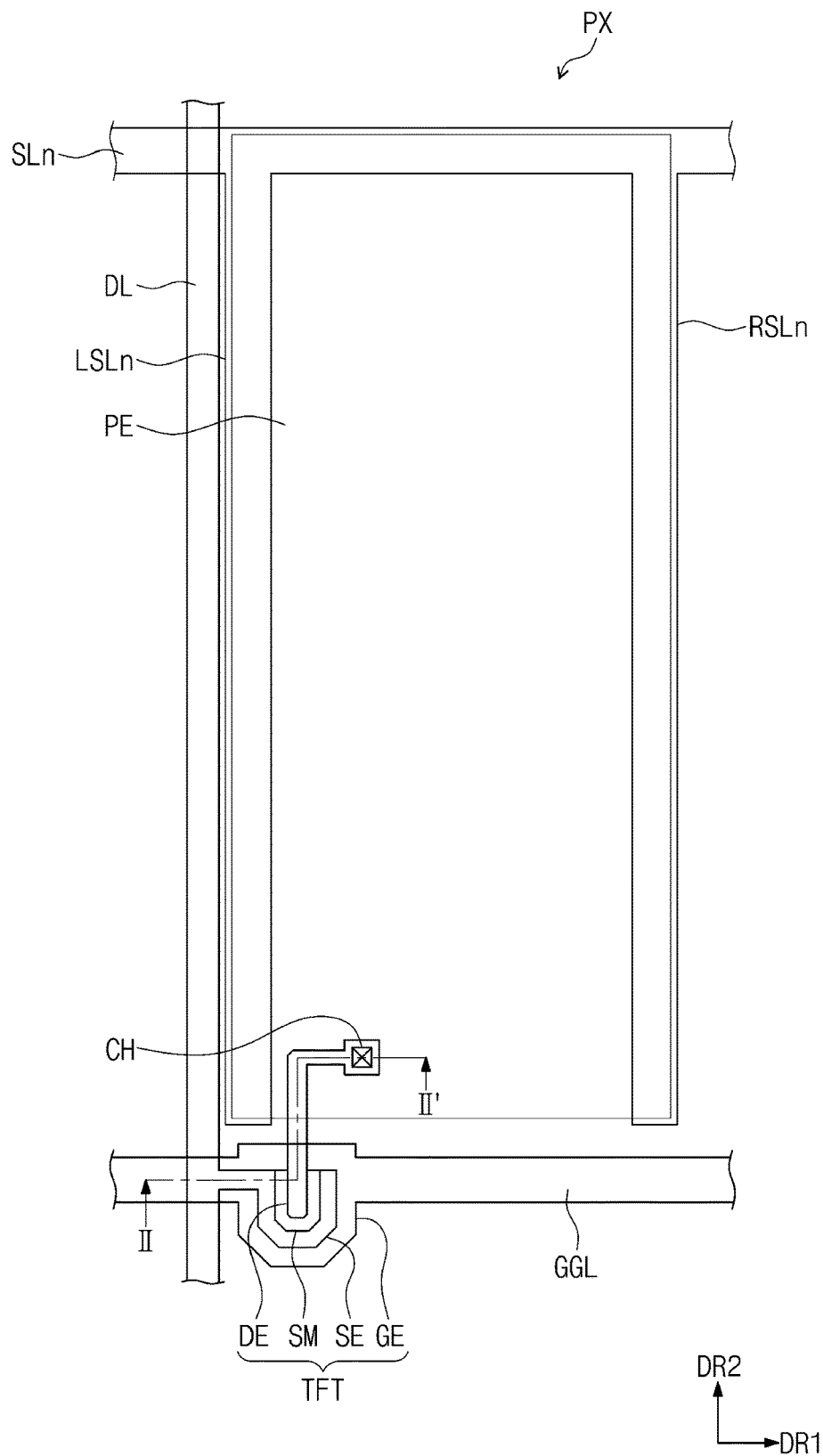
FIG. 3 is a schematic plan view illustrating one of pixels included in a display apparatus according to an exemplary embodiment of the invention.
Figure 4:
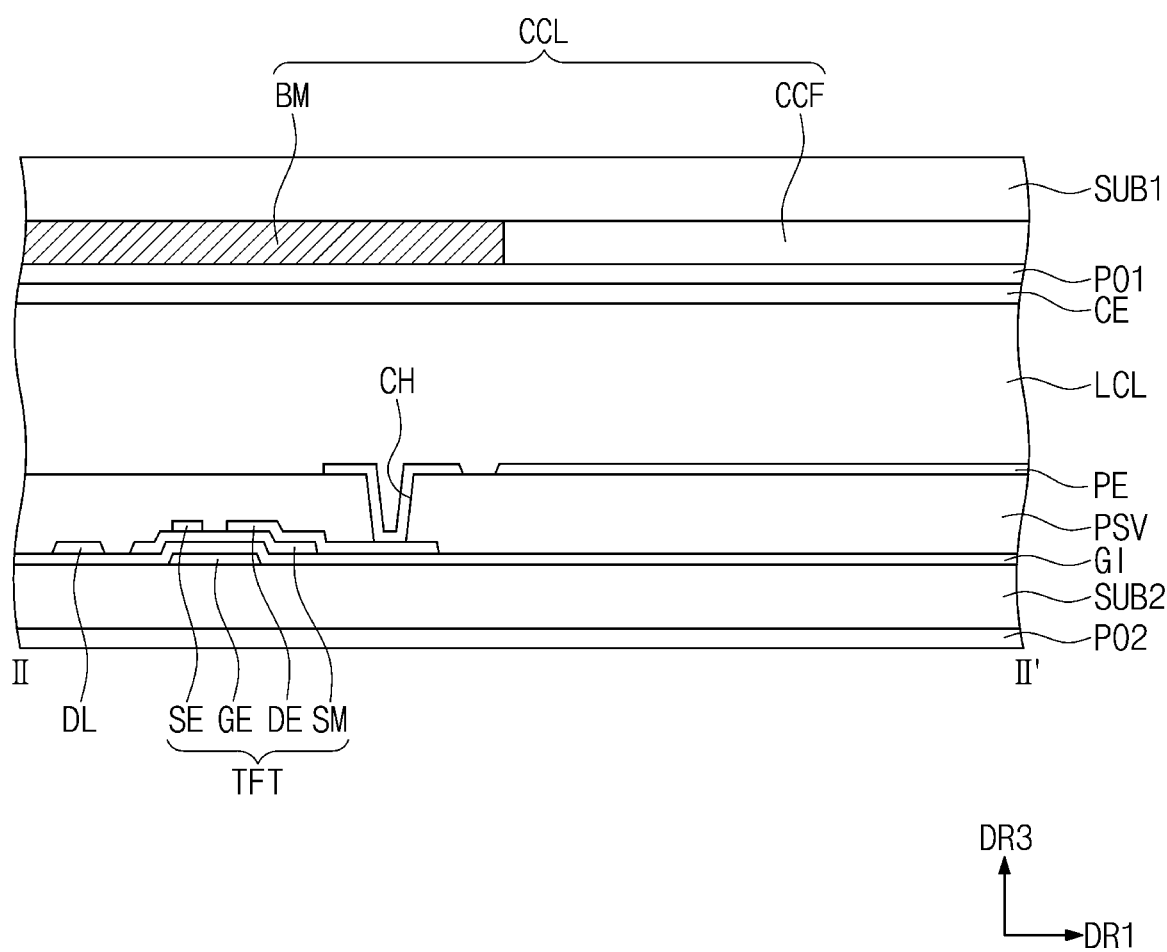
FIG. 4 is a cross-sectional view corresponding to a line II-II' of FIG. 3.

FIG. 1 is an exploded perspective view illustrating an exemplary embodiment of a display apparatus according to the invention. FIG. 2 is a cross-sectional view illustrating an exemplary embodiment of a display apparatus according to the invention. FIG. 2 is a cross-sectional view taken along line I-I' of FIG. 1. FIG. 3 is a schematic plan view illustrating an exemplary embodiment of one of pixels included in a display apparatus DD according to the invention. FIG. 4 may be a cross-sectional view taken along line II-II' of FIG. 3.

Referring to FIGS. 1 and 2, a display apparatus DD according to an exemplary embodiment may include a display panel DP, a light source unit BLU providing light to the display panel DP, and an optical member PM disposed on the display panel DP. The display panel DP may provide an image, and the light source unit BLU may generate blue light. The optical member PM may improve reflection characteristics of the display apparatus DD by external light.

The light source unit BLU may generate the blue light and may provide the generated blue light to the display panel DP. The light source unit BLU may be disposed under the display panel DP to provide the blue light to the display panel DP. In an exemplary embodiment, for example, the blue light provided by the light source unit BLU may be light of a wavelength band ranging from about 350 nm to about 450 nm.

The light source unit BLU may include a plurality of light-emitting elements. The light source unit BLU may include the plurality of light-emitting elements and a circuit substrate or a circuit board providing power to the light-emitting elements. The light-emitting elements may be disposed on the circuit substrate in the light source unit BLU. For example, the light-emitting elements may generate the blue light in the light source unit BLU.

The display panel DP may be disposed on the light source unit BLU. The display panel DP may include a display area DA displaying an image and a non-display area NDA not displaying an image. The non-display area NDA may be disposed around the display area DA.

The display panel DP may have a quadrilateral shape having a plane defined by an axis of a first direction DR1 and an axis of a second direction DR2. However, the invention is not limited thereto. In certain exemplary embodiments, the shape of the display area DA and the shape of the non-display area NDA may be relatively and variously designed. The display panel DP may generate an image and may provide the generated image through a front surface thereof. The display panel DP may provide the generated image in a third direction DR3.

The display apparatus DD having a flat shape is illustrated in FIG. 1. However, the invention is not limited thereto. In certain exemplary embodiments, the display apparatus DD may be a curved display apparatus. For example, the display apparatus DD may be a curved display apparatus which is wholly concavely or convexly curved when a user views the display apparatus. In certain exemplary embodiments, the display apparatus DD may be a display apparatus which is bent at only a portion thereof.

In some exemplary embodiments, the display apparatus DD may be a flexible display apparatus. For example, the display apparatus DD may be a foldable display apparatus or a rollable display apparatus.

The display apparatus DD according to the invention may be a liquid crystal display ("LCD") apparatus that includes a liquid crystal layer LCL provided in the display panel DP. The display apparatus DD according to the invention may be a photo-luminescent liquid crystal display ("PLD") apparatus that has a color conversion layer CCL including a quantum dot or fluorescent substance for implementing a color.

The display area DA of the display panel DP in an exemplary embodiment may include a plurality of pixel areas PX-B, PX-G, and PX-R. The pixel areas PX-B, PX-G, and PX-R may be defined by, for example, a plurality of gate lines and a plurality of data lines. The pixel areas PX-B, PX-G, and PX-R may be arranged in a matrix form. A pixel PX (see FIG. 3) may be disposed in each of the pixel areas PX-B, PX-G, and PX-R.

The display panel DP may include a first pixel area, a second pixel area and a third pixel area which emit lights of which wavelengths are different from each other. In the exemplary embodiment illustrated in FIGS. 1 and 2, the first pixel area may be a blue pixel area PX-B, the second pixel area may be a green pixel area PX-G, and the third pixel area may be a red pixel area PX-R. In other words, in the exemplary embodiment, the display panel DP may include the blue pixel area PX-B, the green pixel area PX-G, and the red pixel area PX-R. The blue pixel area PX-B corresponds to a blue light-emitting area emitting blue light. The green pixel area PX-G and the red pixel area PX-R correspond to a green light-emitting area and a red light-emitting area, respectively.

The display panel DP may include a first substrate SUB1 and a second substrate SUB2 facing each other and the liquid crystal layer LCL. The second substrate SUB2 may face the first substrate SUB1 and may be closer to the light source unit BLU than the first substrate SUB1. In other words, the second substrate SUB2 may be disposed between the first substrate SUB1 and the light source unit BLU.

In certain exemplary embodiments, the first substrate SUB1 and the second substrate SUB2 may each independently be a polymer substrate, a plastic substrate, a glass substrate, or a quartz substrate. In certain exemplary embodiments, the first substrate SUB1 and the second substrate SUB2 may be transparent insulating substrates. In some exemplary embodiments, each of the first substrate SUB1 and the second substrate SUB2 may be rigid. In other exemplary embodiments, each of the first substrate SUB1 and the second substrate SUB2 may be flexible.

Referring to FIG. 4, a common electrode CE may be disposed on the first substrate SUB1, and a pixel electrode PE may be disposed on the second substrate SUB2. In other words, the common electrode CE may be disposed on a bottom surface of the first substrate SUB1, and the pixel electrode PE may be disposed on a top surface of the second substrate SUB2. In some exemplary embodiments, the bottom surface of the first substrate SUB1 may be a surface of the first substrate SUB1 adjacent to the liquid crystal layer LCL, and the top surface of the second substrate SUB2 may be a surface of the second substrate SUB2 adjacent to the liquid crystal layer LCL.

The liquid crystal layer LCL may be disposed between the first substrate SUB1 and the second substrate SUB2. The liquid crystal layer LCL may be disposed between the first and second substrates SUB1 and SUB2 and may include a plurality of liquid crystal molecules. The liquid crystal molecules having dielectric anisotropy may be arranged in the liquid crystal layer LCL. Commonly used liquid crystal molecules may be used in the liquid crystal layer LCL, and the liquid crystal molecules according to the invention are not limited to specific liquid crystal molecules. In an exemplary embodiment, for example, the liquid crystal molecules may be formed of an alkenyl-based liquid crystal compound or an alkoxy-based liquid crystal compound. The liquid crystal molecules used in exemplary embodiments of the invention may have negative dielectric anisotropy. However, the invention is not limited thereto. In other exemplary embodiments, liquid crystal molecules having positive dielectric anisotropy may be used in the liquid crystal layer LCL.

FIG. 3 illustrates one pixel. A structure of each of the other pixels may be substantially the same or similar as a structure of the pixel illustrated in FIG. 3. One pixel PX connected to one of gate lines GGL and one of data lines DL is illustrated in FIGS. 3 and 4 for the purpose of ease and convenience in description and illustration. However, the invention is not limited thereto. In certain exemplary embodiments, a plurality of pixels may be connected to one gate line and one data line, or one pixel may be connected to a plurality of gate lines and a plurality of data lines.

Referring to FIGS. 3 and 4, the gate line GGL is disposed to extend in the first direction DR1. The gate line GGL may be disposed on the second substrate SUB2. The data line DL may extend in the second direction DR2 which intersects the first direction DR1 corresponding to the extending direction of the gate line GGL.

Each of the pixels PX includes a thin film transistor TFT, the pixel electrode PE connected to the thin film transistor TFT, and a storage electrode part. The thin film transistor TFT includes a gate electrode GE, a gate insulating layer GI, a semiconductor pattern SM, a source electrode SE, and a drain electrode DE. The storage electrode part may include a storage line SLn extending in the first direction DR1 and may further include a first branch electrode LSLn and a second branch electrode RSLn which are branched from the storage line SLn to extend in the second direction DR2.

The gate electrode GE may protrude from the gate line GGL or may be provided on a predetermined area of the gate line GGL. The gate electrode GE may include a metal. In an exemplary embodiment, for example, the gate electrode GE may include at least one of nickel, chromium, molybdenum, aluminum, titanium, copper, tungsten, or any alloy thereof. The gate electrode GE may be provided as a single layer or multiple layers using the metal. In an exemplary embodiment, for example, the gate electrode GE may consist of triple layers including molybdenum, aluminum and molybdenum which are sequentially stacked. Alternatively, the gate electrode GE may be provide as double layers including titanium and copper which are sequentially stacked. In still another exemplary embodiment, the gate electrode GE may be a single layer consisting of an alloy of titanium and copper.

The semiconductor pattern SM is provided on the gate insulating layer GI. The semiconductor pattern SM is provided on the gate electrode GE with the gate insulating layer GI interposed therebetween. A portion of the semiconductor pattern SM overlaps with the gate electrode GE. The semiconductor pattern SM includes an active pattern (not shown) provided on the gate insulating layer GI and an ohmic contact layer (not shown) provided on the active pattern. The active pattern (not shown) may include an amorphous silicon thin layer, and the ohmic contact layer (not shown) may include an n+ amorphous silicon thin layer. The ohmic contact layer (not shown) provides ohmic contact between the active pattern and the source electrode SE and between the active pattern and the drain electrode DE.

The source electrode SE is branched from the data line DL. The source electrode SE is disposed on the ohmic contact layer (not shown), and a portion of the source electrode SE overlaps with the gate electrode GE. The data line DL may be disposed on an area of the gate insulating layer GI on which the semiconductor pattern SM is not disposed.

The drain electrode DE is spaced apart from the source electrode SE with a portion of the semiconductor pattern SM interposed therebetween when viewed in a plan view. The drain electrode DE is disposed on the ohmic contact layer (not shown), and a portion of the drain electrode DE overlaps with the gate electrode GE.

In an exemplary embodiment, for example, the source electrode SE and the drain electrode DE may include at least one of nickel, chromium, molybdenum, aluminum, titanium, copper, tungsten, or any alloy thereof. The source electrode SE and the drain electrode DE may be provided as a single layer or multiple layers using the metal. In an exemplary embodiment, for example, the source electrode SE and the drain electrode DE may be provided as a double layer in which titanium and copper are sequentially stacked. Alternatively, the source electrode SE and the drain electrode DE may be a single layer formed of an alloy of titanium and copper.

Thus, a top surface of the active pattern between the source electrode SE and the drain electrode DE is exposed in a plan view, and the active pattern between the source and drain electrodes SE and DE in a plan view is defined as a channel portion in which a conductive channel is generated between the source electrode SE and the drain electrode DE when a predetermined voltage is applied to the gate electrode GE. The source electrode SE and the drain electrode DE overlap with portions of a remaining area of the semiconductor pattern SM except the channel portion defined between the source and drain electrodes SE and DE in a plan view.

The pixel electrode PE is connected to the drain electrode DE through a passivation layer PSV interposed therebetween. The pixel electrode PE partially overlaps with the storage line SLn, the first branch electrode LSLn and the second branch electrode RSLn to form a storage capacitor.

The passivation layer PSV covers the source electrode SE, the drain electrode DE, the channel portion, and the gate insulating layer GI and defines a contact hole CH exposing a portion of the drain electrode DE. In an exemplary embodiment, the passivation layer PSV may include, for example, silicon nitride or silicon oxide.

The pixel electrode PE is connected to the drain electrode DE through the contact hole CH defined by the passivation layer PSV. The pixel electrode PE includes a transparent conductive material. In an exemplary embodiment, the pixel electrode PE may include a transparent conductive oxide. The transparent conductive oxide may be indium tin oxide ("ITO"), indium zinc oxide ("IZO"), or indium tin zinc oxide ("ITZO").

The color conversion layer CCL and the common electrode CE may be disposed on the first substrate SUB1. In addition, a first polarizing layer PO1 may be disposed on the first substrate SUB1. The first polarizing layer PO1 may be disposed on a bottom surface of the color conversion layer CCL. The first polarizing layer PO1 may be disposed between the common electrode CE and the color conversion layer CCL.

The color conversion layer CCL may include a conversion part CCF and a light shielding part BM. The light shielding part BM is provided to correspond to a light shielding area of the first substrate SUB1. The light shielding area may be defined as an area in which the data line DL, the thin film transistor TFT and the gate line GGL are disposed. The light shielding part BM is disposed on the light shielding area to block leakage light. In this exemplary embodiment, the light shielding part BM is included in the color conversion layer CCL disposed on the first substrate SUB1. However, the invention is not limited thereto. In certain exemplary embodiments, the light shielding part BM may be disposed on the second substrate SUB2.

The common electrode CE is provided on the first substrate SUB1 and forms an electric field with the pixel electrode PE to control the liquid crystal layer LCL. In this exemplary embodiment, the common electrode CE is disposed on the first substrate SUB1. However, the invention is not limited thereto. In certain exemplary embodiments, the common electrode CE may be disposed on the second substrate SUB2. The common electrode CE may include a transparent conductive material. In an exemplary embodiment, for example, the common electrode CE may include a transparent conductive metal oxide such as ITO, IZO, or ITZO. An orientation inducing layer (not shown) for orienting liquid crystal molecules may be disposed on each of the common electrode CE and the pixel electrode PE. In particular, the orientation inducing layers (not shown) may be respectively disposed on a bottom surface of the common electrode CE and a top surface of the pixel electrode PE, which are adjacent to the liquid crystal layer LCL.

Referring again to FIG. 2, in an exemplary embodiment, the display panel DP may include the first polarizing layer PO1 and a second polarizing layer PO2, which face each other. The first polarizing layer PO1 may be disposed between the first substrate SUB1 and the liquid crystal layer LCL. The first polarizing layer PO1 may be an in-cell type polarizing layer that is disposed adjacent to the liquid crystal layer LCL.

The first polarizing layer PO1 may be a reflective polarizer that transmits light oscillating in one direction and reflects light oscillating in another direction substantially perpendicular to the one direction. In an exemplary embodiment, for example, the first polarizing layer PO1 may be a reflective polarizer that transmits light oscillating in the first direction DR1 and reflects light oscillating in the second direction DR2. In other words, a transmission axis of the first polarizing layer PO1 may be parallel to the first direction DR1.

The first polarizing layer PO1 may be a wire grid polarizer or a multilayer polarizer. In other words, in an exemplary embodiment, the first polarizing layer PO1 may be the in-cell type reflective polarizer.

The second polarizing layer PO2 may be disposed opposing and to face the first polarizing layer PO1 with respect to the liquid crystal layer LCL interposed therebetween. The second polarizing layer PO2 may be disposed on the top surface or bottom surface of the second substrate SUB2. For example, in the exemplary embodiment of FIG. 2, the second polarizing layer PO2 is disposed between the second substrate SUB2 and the light source unit BLU. However, the invention is not limited thereto. In other exemplary embodiments, the second polarizing layer PO2 may be disposed between the second substrate SUB2 and the liquid crystal layer LCL. In other words, the second polarizing layer PO2 may be an in-cell type polarizer.

The second polarizing layer PO2 may have a transmission axis that extends in the second direction DR2 perpendicular to the first direction DR1, the transmission axis, of the first polarizing layer PO1. The second polarizing layer PO2 may be an absorbing polarizer that transmits light oscillating in the second direction DR2 and absorbs light oscillating in the first direction DR1 perpendicular to the second direction DR2. Alternatively, the second polarizing layer PO2 may be a reflective polarizer that transmits light oscillating in the second direction DR2 and reflects light oscillating in the first direction DR1 perpendicular to the second direction DR2.

The second polarizing layer PO2 may be a polarizing layer formed by a coating method or a polarizing layer formed by a deposition method. In an exemplary embodiment, for example, the second polarizing layer PO2 may be formed by performing the coating method using a material including a dichroic dye and a liquid crystal compound. Alternatively, the second polarizing layer PO2 may be a wire grid polarizer.

Referring again to FIG. 2, the display panel DP includes the color conversion layer CCL. The color conversion layer CCL may be disposed on the liquid crystal layer LCL. The color conversion layer CCL may include an illuminant that absorbs the blue light provided from the light source unit BLU and emits green light or red light. In other words, the illuminant may convert the absorbed blue light into the green light or the red light.

Figure 5A:
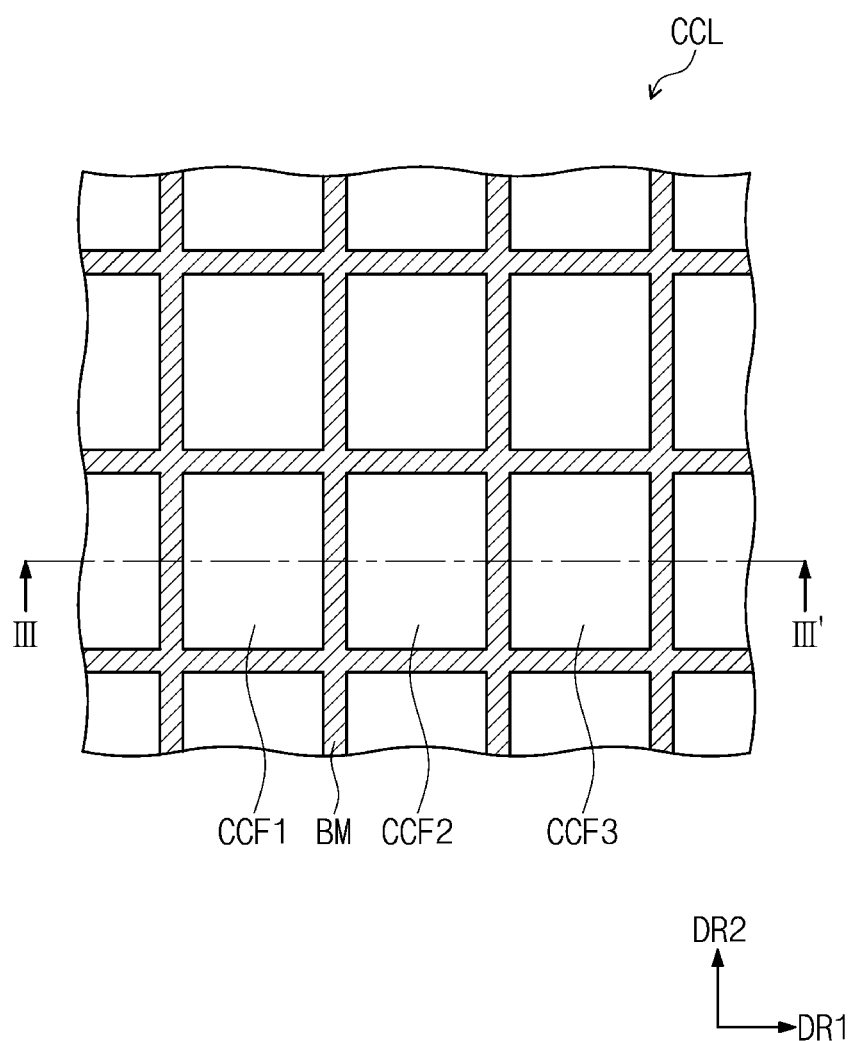
FIG. 5A is a plan view illustrating an exemplary embodiment of a color conversion layer included in a display apparatus according the invention.
Figure 5B:
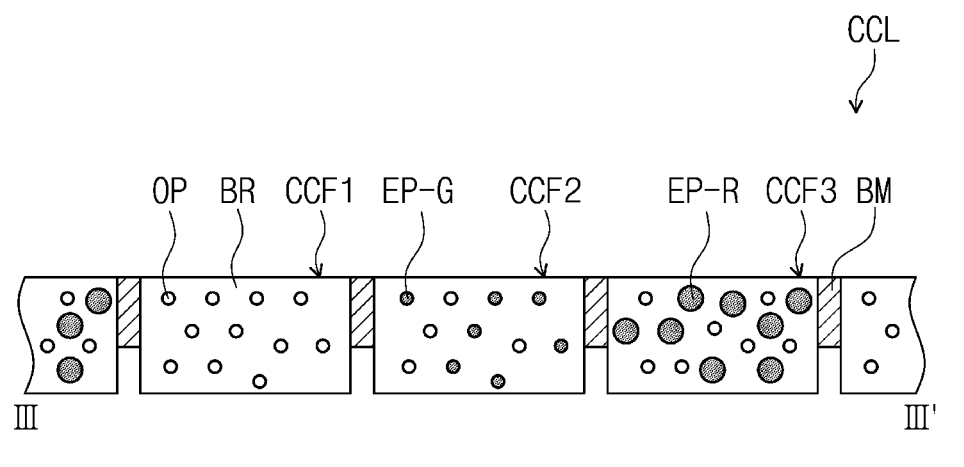
FIG. 5B is a cross-sectional view taken along line III-III' of FIG. 5A.

FIG. 5A is a plan view illustrating an exemplary embodiment of a color conversion layer CCL, and FIG. 5B is a cross-sectional view taken along line of FIG. 5A. FIGS. 5A and 5B illustrate an exemplary embodiment of the color conversion layer CC included in the display apparatus DD of FIG. 2.

The color conversion layer CCL may include a plurality of conversion parts CCF1, CCF2, and CCF3 and the light shielding part BM. In an exemplary embodiment, the first to third conversion parts CCF1, CCF2, and CCF3 of the color conversion layer CCL may be spaced apart from each other in a plane. As illustrated in FIG. 5A, the first to third conversion parts CCF1, CCF2, and CCF3 may be spaced apart from each other and be arranged in a plane defined by the axis of the first direction DR1 and the axis of the second direction DR2.

Referring to FIG. 5A, the first to third conversion parts CCF1, CCF2, and CCF3 which emit lights having different colors may be arranged in a line along the first direction DR1, and the conversion parts emitting the same color light may be arranged in a line along the second direction DR2. The light shielding part BM in the color conversion layer CCL may be disposed between the conversion parts spaced apart from each other. The light shielding part BM in the color conversion layer CCL may be a black matrix. In an exemplary embodiment, the light shielding part BM in the color conversion layer CCL may include an organic light shielding material or inorganic light shielding material including a black pigment or dye. The light shielding part BM in the color conversion layer CCL may prevent a leakage phenomenon of light and may define a boundary between the conversion parts adjacent to each other.

Even though not shown in FIG. 2, at least a portion of the light shielding part BM in the color conversion layer CCL may overlap with the conversion parts adjacent thereto. In other words, in a cross sectional view defined by the axis of the first direction DR1 and an axis of the third direction DR3, at least a portion of the light shielding part BM may overlap with the conversion parts adjacent thereto in a thickness direction of the light shielding part BM.

In an exemplary embodiment, the color conversion layer CCL may include a first illuminant absorbing first color light and emitting second color light and a second illuminant absorbing the first color light and emitting third color light. In other words, the first illuminant may convert the first color light into the second color light and the second illuminant may convert the first color light into the third color light. A color of the third color light may be different from that of the second color light. In an exemplary embodiment, for example, the first color light may be blue light, the second color light may be green light, and the third color light may be red light.

Referring to FIG. 5B, the color conversion layer CCL may include the first conversion part CCF1 not including an illuminant, the second conversion part CCF2 including a first illuminant EP-G, and the third conversion part CCF3 including a second illuminant EP-R.

In an exemplary embodiment, for example, the first illuminant EP-G may absorb the first color light (i.e., the blue light) and may emit the green light, and the second illuminant EP-R may absorb the first color light (i.e., the blue light) and may emit the red light. In other words, the second conversion part CCF2 may be a light-emitting area emitting the green light, and the third conversion part CCF3 may be a light-emitting area emitting the red light.

The first conversion part CCF1 may be a part that transmits the first color light provided from the light source unit BLU (see FIG. 2). In other words, the first conversion part CCF1 may be a light-emitting area emitting the blue light.

The first conversion part CCF1, the second conversion part CCF2 and the third conversion part CCF3 of the color conversion layer CCL correspond to the blue pixel area PX-B, the green pixel area PX-G and the red pixel area PX-R of the display panel DP, respectively.

In an exemplary embodiment, the first to third conversion parts CCF1 to CCF3 may be arranged in the first direction DR1 in the order listed. In addition, the same conversion parts may be arranged in the second direction DR2 perpendicular to the first direction DR1. For example, the first conversion part CCF1, the second conversion part CCF2, and the third conversion part CCF3 which are sequentially arranged may be repeatedly arranged in the first direction DR1. In the second direction DR2, the first conversion parts CCF1 may be successively arranged, the second conversion parts CCF2 may be successively arranged, or the third conversion parts CCF3 may be successively arranged. However, the arrangement of the first to third conversion parts CCF1 to CCF3 is not limited the arrangement described above. In other exemplary embodiments, the arrangement of the first to third conversion parts CCF1 to CCF3 may be variously changed depending on a design of pixel areas of a display panel.

Referring again to FIG. 5B, the first to third conversion parts CCF1, CCF2, and CCF3 may include a base resin BR.

The base resin BR may be a polymer resin. In an exemplary embodiment, for example, the base resin BR may be an acrylic-based resin, a urethane-based resin, a silicon-based resin, or an epoxy-based resin. The base resin BR may be a transparent resin.

The first to third conversion parts CCF1, CCF2, and CCF3 may further include scattering particles OP. In an exemplary embodiment, the scattering particle OP may be a $TiO_2$ or silica-based nanoparticle. The scattering particles OP may scatter light emitted from the illuminant to emit the scattered light to the outside of the conversion part. In the first conversion part CCF1 which has no illuminant and directly transmits the provided blue light, the scattering particles OP may scatter the provided blue light to emit the provided blue light to the outside of the conversion part.

The illuminant EP-G or EP-R included in the color conversion layer CCL may be a fluorescent substances or a quantum dot. In other words, in an exemplary embodiment, the color conversion layer CCL may include at least one of the fluorescent substance or the quantum dot as the illuminant EP-G or EP-R.

The fluorescent substance used as the illuminant EP-G or EP-R may be an inorganic fluorescent substance. In an exemplary embodiment, the fluorescent substance used as the illuminant EP-G or EP-R may be a green fluorescent substance or a red fluorescent substance.

In an exemplary embodiment, the green fluorescent substance may include at least one of $YBO_3:Ce^{3+}$, $Tb^{3+}$, $BaMgAl_{10}O_{17}:Eu^{2+}$, $Mn^{2+}$, $(Sr,Ca,Ba)(Al,Ga)_2S_4:Eu^{2+}$; $ZnS:Cu,Al$, $Ca_8Mg(SiO_4)_4Cl_2:Eu^{2+}$, $Mn^{2+}$; $Ba_2SiO_4:Eu^{2+}$; $(Ba,Sr)_2SiO_4:Eu^{2+}$; $Ba_2(Mg, Zn)Si_2O_7:Eu^{2+}$; $(Ba,Sr)Al_2O_4:Eu^{2+}$, $Sr_2Si_3O_8.2SrCl_2:Eu^{2+}$; and the like.

In an exemplary embodiment, the red fluorescent substance may include at least one of $(Sr,Ca,Ba,Mg)P_2O_7:Eu^{2+}$, $Mn^{2+}$, $CaLa_2S_4:Ce^{3+}$; $SrY_2S_4:Eu^{2+}$, $(Ca,Sr)S:Eu^{2+}$, $SrS:Eu$ $Eu^{2+}$, $Y_2O_3:Eu^{3+}$, $Bi^{3+}$; $YVO4:Eu^{3+}$, $Bi^{3+}$; $Y_2O_2S:Eu^{3+}$, $Bi^{3+}$; $Y_2O_2S:Eu^{3+}$, and the like.

However, the kind of the fluorescent substance used in the color conversion layer CCL is not limited to the materials described above. In other exemplary embodiments, the fluorescent substance may use other known fluorescent substances except the fluorescent substances described above.

In other exemplary embodiments, the illuminant EP-G or the EP-R included in the color conversion layer CCL may be the quantum dot. The quantum dot may include at least one of a group II-VI compound, a group III-V compound, a group IV-VI compound, a group IV element, a group IV compound, and any combination thereof.

The group II-VI compound may include at least one of a binary compound including at least one of CdSe, CdTe, ZnS, ZnSe, ZnTe, ZnO, HgS, HgSe, HgTe, MgSe, MgS, and any mixture thereof, a ternary compound including at least one of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and any mixture thereof, and a quaternary compound including at least one of HgZnTeS, CdZnSeS, CdZnSeTe, CdZnSTe, CdHgSeS, CdHgSeTe, CdHgSTe, HgZnSeS, HgZnSeTe, HgZnSTe, and any mixture thereof.

The group III-V compound may include at least one of a binary compound including at least one of GaN, GaP, GaAs, GaSb, AlN, AlP, AlAs, AlSb, InN, InP, InAs, InSb, and any mixture thereof, a ternary compound including at least one of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and any mixture thereof, and a quaternary compound including at least one of GaAlNAs, GaAlNSb, GaAl-PAs, GaAlPSb, GaInNP, GaInNAs, GaInNSb, GaInPAs, GaInPSb, InAlNP, InAlNAs, InAlNSb, InAlPAs, InAlPSb, and any mixture thereof. The group IV-VI compound may include at least one of a binary compound including at least one of SnS, SnSe, SnTe, PbS, PbSe, PbTe, and any mixture thereof; a ternary compound including at least one of SnSeS, SnSeTe, SnSTe, PbSeS, PbSeTe, PbSTe, SnPbS, SnPbSe, SnPbTe, and any mixture thereof; and a quaternary compound including at least one of SnPbSSe, SnPbSeTe, SnPbSTe, and any mixture thereof. The group IV element may include at least one of Si, Ge, and a mixture thereof. The group IV compound may be a binary compound including at least one of SiC, SiGe, and a mixture thereof.

In these cases, the binary compound, the ternary compound, or the quaternary compound may be distributed in the quantum dot with a substantially uniform concentration regardless of a position of the quantum dot. Alternatively, a concentration of the binary compound, the ternary compound or the quaternary compound in a portion of the quantum dot may be different from that of the binary compound, the ternary compound or the quaternary compound in another portion of the quantum dot.

The quantum dot may have a core-shell structure that includes a core and a shell surrounding the core. Alternatively, the quantum dots may have a core/shell structure in which one quantum dot surrounds another quantum dot. An interface of the core and the shell may have a concentration gradient in which a concentration of an element existing in the shell becomes progressively less toward a center.

The quantum dot may be a nano-sized particle. The quantum dot may have a full width of half maximum ("FWHM") of an emission wavelength spectrum that is about 45 nm or less (in particular, about 40 nm or less, and in more particular, about 30 nm or less), and color purity and/or color reproduction can be improved in the range. In addition, light emitted through the quantum dot may be emitted in all directions, and thus a wide viewing angle can be improved or achieved.

Furthermore, a shape of the quantum dot may be a general shape known in the art but is not limited to a specific shape. In an exemplary embodiment, for example, the quantum dot may have a spherical shape, a pyramidal shape, a multi-arm shape, a cubic nanoparticle shape, a nanotube shape, a nanowire shape, a nanofiber shape, or a nano-plate particle shape.

A color of light emitted from the quantum dot may be changed depending on a particle size of the quantum dot. When the first illuminant EP-G and the second illuminant EP-R are the quantum dots, a particle size of the first illuminant EP-G may be different from a particle size of the second illuminant EP-R. In an exemplary embodiment, for example, the particle size of the first illuminant EP-G may be smaller than the particle size of the second illuminant EP-R. In this case, a wavelength of light emitted from the first illuminant EP-G may be shorter than a wavelength of light emitted from the second illuminant EP-R.

Referring again to FIG. 2, in an exemplary embodiment, the display panel DP may further include a reflective layer RP disposed between the color conversion layer CCL and the first polarizing layer PO1.

The reflective layer RP may be disposed to overlap with some of a plurality of pixel areas. In an exemplary embodiment, the reflective layer RP may overlap with the green pixel area PX-G and the red pixel area PX-R but may not overlap with the blue pixel area PX-B. The reflective layer RP may be a selective transmission-reflection layer. The reflective layer RP may reflect the green light and the red light.

The reflective layer RP may transmit the blue light provided from the light source unit BLU and may reflect the green light and red light which are emitted from the second and third conversion parts CCF2 and CCF3 of the color conversion layer CCL toward a downward direction of the display panel DP. The green light and the red light reflected by the reflective layer RP may exit from the color conversion layer CCL in an upward direction of the display panel DP. The reflective layer RP may be a single layer or multiple layers including a plurality of stacked insulating layers.

Figure 6:
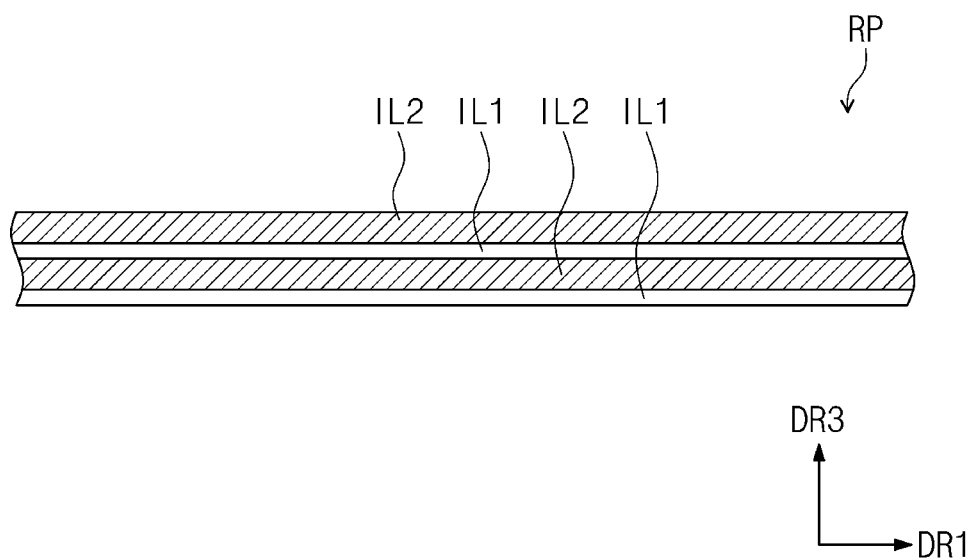
FIG. 6 is a cross-sectional view illustrating an exemplary embodiment of a reflective layer included in a display apparatus according to the invention.

FIG. 6 is an enlarged cross-sectional view illustrating an exemplary embodiment of the reflective layer RP included in the display apparatus DD illustrated in FIG. 2. FIG. 6 is a cross-sectional view illustrating an exemplary embodiment of the reflective layer RP including a plurality of insulating layers. The reflective layer RP including the plurality of insulating layers may have ranges of transmission and reflection wavelengths which are determined depending on a difference in refractive index between stacked layers, a thickness of each of the stacked layers, and the number of the stacked layers.

In an exemplary embodiment, the reflective layer RP may include a first insulating layer IL1 and a second insulating layer IL2 which have different refractive indexes from each other. The reflective layer RP may include at least one first insulating layer IL1 and at least one second insulating layer IL2. Each of the first insulating layer IL1 and the second insulating layer IL2 may be provided in plurality, and the first insulating layers IL1 and the second insulating layers IL2 may be alternately stacked.

In an exemplary embodiment, for example, a metal oxide material may be used as a high refractive index layer having a relatively high refractive index, and the high refractive index layer may include at least one of $TiO_x$, $TaO_x$, $HfO_x$, and $ZrO_x$. In addition, a low refractive index layer having a relatively low refractive index may include $SiO_x$ or $SiCO_x$.

In another exemplary embodiment, the reflective layer RP may be provided by alternately and repeatedly depositing $SiN_x$ and $SiO_x$. However, the materials of the first and second insulating layers IL1 and IL2 according to the invention are not limited to the described materials.

The reflective layer RP may be disposed to surround exposed portions of the second and third conversion parts CCF2 and CCF3 of the color conversion layer CCL. The reflective layer RP may be disposed on the second and third conversion parts CCF2 and CCF3 and the light shielding part BM adjacent to the second and third conversion parts CCF2 and CCF3. The reflective layer RP may also act as a protective layer protecting the color conversion layer CCL.

Referring to FIG. 2, the reflective layer RP may be disposed on an uneven structure provided by the second and third conversion parts CCF2 and CCF3 and the light shielding part BM of the color conversion layer CCL. In other words, the reflective layer RP may have an uneven portion disposed along surfaces of the second and third conversion parts CCF2 and CCF3 and a surface of the light shielding part BM adjacent thereto, which face the first polarizing layer PO1.

A planarization layer OC may be disposed on the reflective layer RP. The planarization layer OC may be disposed to overlap with all of the conversion parts CCF1 to CCF3 and the light shielding part BM of the color conversion layer CCL. The planarization layer OC may be disposed between the reflective layer RP and the first polarizing layer PO1 to fill concave portions of the uneven portion of the reflective layer RP and then provide an even surface facing the first polarizing layer PO1. In addition, the planarization layer OC may also act as a supporter supporting the first polarizing layer PO1.

In an exemplary embodiment of the display apparatus DD according to the invention, the display panel DP may further include an optical filter layer FP. The optical filter layer FP may be disposed on the color conversion layer CCL. The optical filter layer FP may be disposed on the color conversion layer CCL to block the first color light and to transmit the second color light or the third color light. In other words, the optical filter layer FP may block the blue light and may transmit the green light and the red light.

The optical filter layer FP may be disposed on the second conversion part CCF2 and the third conversion part CCF3. The optical filter layer FP may be disposed between the first substrate SUB1 and the second conversion part CCF2 and between the first substrate SUB1 and the third conversion part CCF3. The optical filter layer FP may be a single layer or multiple layers including a plurality of stacked layers. In an exemplary embodiment, for example, the optical filter layer FP may be a single layer including a material absorbing the blue light, or the optical filter layer FP may have a structure in which both a low refractive index layer and a high refractive index layer are stacked, like the reflective layer RP.

In an exemplary embodiment, the optical filter layer FP may include a pigment or dye to block light of a specific wavelength. For example, the optical filter layer FP may be a yellow color filter layer that absorbs the blue light to block the blue light. In another exemplary embodiment, the optical filter layer FP may be a blue light filter layer.

The optical member PM may be disposed on the display panel DP. The optical member PM may be disposed on a top surface of the display panel DP. The optical member PM may be disposed on the display panel DP to block reflected light of the display panel DP caused by external light provided from the outside of the display apparatus DD.

The optical member PM may include a linear polarizer PP and a λ/4 phase retarder RC. The linear polarizer PP may be disposed on the λ/4 phase retarder RC. The linear polarizer PP may be disposed on the display panel DP to entirely cover the top surface of the display panel DP.

The linear polarizer PP may have a transmission axis that transmits light oscillating in one direction. A direction of the transmission axis of the linear polarizer PP may be the same as a direction of the transmission axis of the first polarizing layer PO1. For example, the linear polarizer PP may have the transmission axis which extends in the first direction DR1 parallel to the transmission axis of the first polarizing layer PO1.

The linear polarizer PP may be a polarizing layer formed by a coating method or a deposition method. For example, the linear polarizer PP may be formed by performing the coating method using a material including a dichroic dye and a liquid crystal compound. Alternatively, the linear polarizer PP may be a wire grid type polarizing layer.

However, the invention is not limited thereto. In certain exemplary embodiments, the linear polarizer PP may be a film type polarizing member. For example, the linear polarizer PP may be a polarizing member which is separately manufactured and is then adhered onto the first substrate SUB1.

On the other hand, even though not shown in the drawings, the linear polarizer PP may further include at least one protective layer. For example, the linear polarizer PP may further include a triacetylcellulose ("TAC") layer which is provided on at least one of a top surface or a bottom surface of the linear polarizer PP. However, the invention is not limited thereto. In certain exemplary embodiments, the linear polarizer PP may further include a hard coating layer, an anti-reflection layer or an anti-glare layer as the protective layer.

The λ/4 phase retarder RC may be disposed between the linear polarizer PP and the display panel DP. The λ/4 phase retarder RC may be disposed to overlap with the green pixel area PX-G and the red pixel area PX-R of the display panel DP. The λ/4 phase retarder RC may not overlap with the blue pixel area PX-B of the display panel DP. In addition, the λ/4 phase retarder RC may overlap with the second and third conversion parts CCF2 and CCF3 of the color conversion layer CCL and may not overlap with the first conversion part CCF1 of the color conversion layer CCL. The λ/4 phase retarder RC may overlap with the reflective layer RP.

In other words, the λ/4 phase retarder RC may be disposed in a region overlapping with the green and red pixel areas PX-G and PX-R between the linear polarizer PP and the display panel DP, but an air layer, not the phase retarder, may be provided in a region overlapping with the blue pixel area PX-B between the linear polarizer PP and the display panel DP. In an exemplary embodiment, the optical member PM may include the λ/4 phase retarder RC which is patterned to overlap with only the green pixel area PX-G and the red pixel area PX-R.

Only the linear polarizer PP may be disposed in a portion of the optical member PM, which corresponds to the blue pixel area PX-B. In other words, the optical member PM overlapping with the blue pixel area PX-B may include the linear polarizer PP but may not include the λ/4 phase retarder RC.

The λ/4 phase retarder RC may be an optical layer that retards a phase of provided light by λ/4. The λ/4 phase retarder RC may change a polarization state of light provided into the λ/4 phase retarder RC. In other words, the polarization state of light provided into the λ/4 phase retarder RC through the linear polarizer PP may be changed from a linear polarization state into a circular polarization state. In addition, when light in the circular polarization state is provided into the λ/4 phase retarder RC, the circular polarization state of the light may be changed into the linear polarization state by the λ/4 phase retarder RC.

Thus, light provided to the display panel DP through the optical member PM may pass through both the linear polarizer PP and the λ/4 phase retarder RC in the green and red pixel areas PX-G and PX-R to be changed as circularly polarized light and may pass through only the linear polarizer PP in the blue pixel area PX-B to be provided as linearly polarized light.

In the optical member PM included in an exemplary embodiment of the display apparatus DD according to the invention, the λ/4 phase retarder RC may be a liquid crystal coating layer. The λ/4 phase retarder RC may be the liquid crystal coating layer made of a reactive liquid crystal monomer. The reactive liquid crystal monomers may be formed and aligned by a coating process, and then, a polymerization process may be performed on the coated reactive liquid crystal monomers to form the λ/4 phase retarder RC. The λ/4 phase retarder RC may consist of only the liquid crystal coating layer without a base material corresponding to a supporter.

For example, when the λ/4 phase retarder RC is the liquid crystal coating layer, a thickness of the λ/4 phase retarder RC may be smaller than a thickness of the linear polarizer PP. Since the λ/4 phase retarder RC of the liquid crystal coating layer has a relatively thin thickness, a height difference between the λ/4 phase retarder RC and the air layer in which the λ/4 phase retarder RC is not disposed may not be great. As a result, the optical member PM can be provided on the display panel DP even though an additional filling layer is not disposed in the air layer. Even though not shown in the drawings, an optically transparent adhesive member may further be disposed between the optical member PM and the display panel DP.

In other words, in the display apparatus DD according to the invention, the display panel DP includes the reflective layer RP which overlaps with the green and red pixel areas PX-G and PX-R but does not overlap with the blue pixel area PX-B. Thus, external light outside the display apparatus DD may be transmitted through the optical member PM and may then be reflected at the reflective layer RP in the green and red pixel areas PX-G and PX-R. In this case, the external light transmitted through the optical member PM may be changed into circularly polarized light while passing through the linear polarizer PP and the λ/4 phase retarder RC. The circularly polarized light may be reflected at the reflective layer RP, and thus the circular polarization state of the light may be changed into an opposite circular polarization state. The light in the opposite circular polarization state may pass through the λ/4 phase retarder RC to be converted into light in a linear polarization state of which polarization direction is perpendicular to the polarization direction of the external light passed through the linear polarizer PP. As a result, the external light reflected at the reflective layer RP does not pass through the linear polarizer PP, and thus reflection of the external light can be blocked. That is, the external light incident to the green and red pixel areas PX-G and PX-R does not exit to the outside of the display apparatus DD.

On the other hand, since the reflective layer RP is not disposed in the blue pixel area PX-B, the reflection of the external light occurs at the first polarizing layer PO1 which corresponds to the blue pixel area PX-B. In this case, the external light passing through the optical member PM including only the linear polarizer PP may be changed into light in a linear polarization state, and the light in the linear polarization state may be reflected at the first polarizing layer PO1 to be changed into light in a linear polarization state of which polarization direction is perpendicular to the polarization direction of the light which is right before reflected at the first polarizing layer PO1. The light reflected at the first polarizing layer PO1 is provided back to the linear polarizer PP. As a result, the external light reflected at the first polarizing layer PO1 does not pass through the linear polarizer PP, and thus reflection of the external light can be blocked. That is, the external light incident to the blue pixel area PX-B does not exit to the outside of the display apparatus DD.

Therefore, in an exemplary embodiment of the display apparatus according to the invention, the λ/4 phase retarder is not disposed in the blue pixel area but is disposed in only the portion corresponding to the green pixel area and the red pixel area. As a result, it is possible to reduce or minimize a reflectance difference of external light between the area having the reflective layer and the area not having the reflective layer. In other words, an exemplary embodiment of the display apparatus according to the invention may use the optical member including the λ/4 phase retarder disposed in only the portion corresponding to the green pixel area and the red pixel area, thereby reducing or minimizing the reflectance difference of the external light between the pixel areas.

Figure 7A:
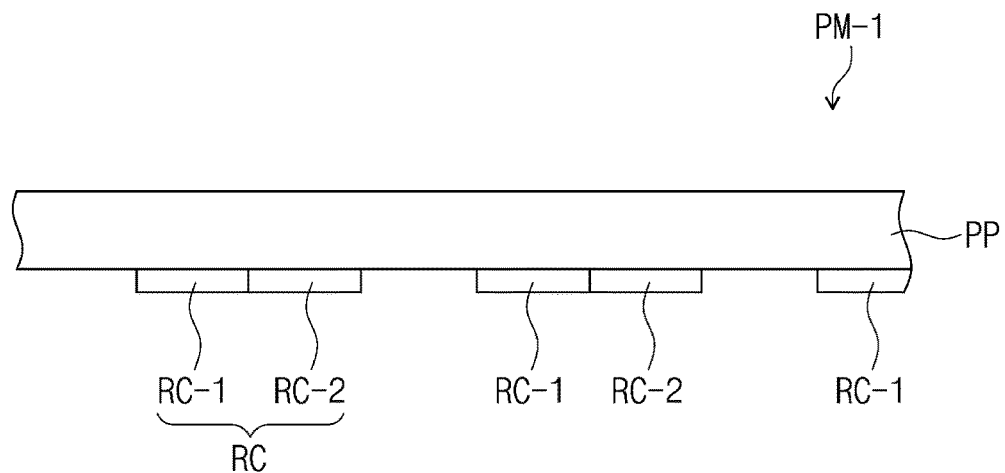
Figure 7B:
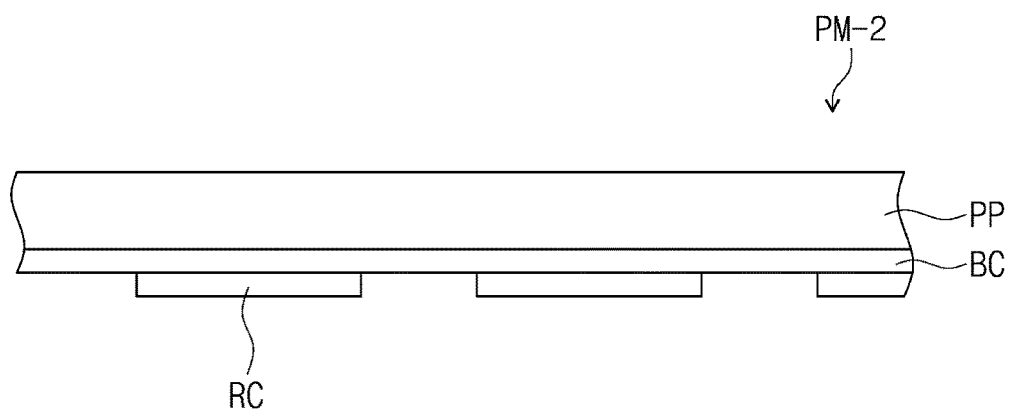

FIGS. 7A to 7C are cross-sectional views illustrating exemplary embodiments of the optical member included in the display apparatus DD according to the invention.

In an exemplary embodiment of an optical member, an optical member PM-1, illustrated in FIG. 7A, a λ/4 phase retarder RC may include a first λ/4 phase retardation part RC-1 and a second λ/4 phase retardation part RC-2. Even though not shown in the drawings, the first λ/4 phase retardation part RC-1 may overlap with the green pixel area PX-G of the display panel DP of FIG. 2, and the second λ/4 phase retardation part RC-2 may overlap with the red pixel area PX-R of the display panel DP of FIG. 2. In other words, the λ/4 phase retarder RC of FIG. 7A includes the first λ/4 phase retardation part RC-1 and the second λ/4 phase retardation part RC-2 distinguished from each other, unlike the λ/4 phase retarder RC of the optical member PM illustrated in FIG. 2. Thus, light passing through the optical member PM-1 of FIG. 7A may be transmitted through the linear polarizer PP to be changed into linearly polarized light, and then, the linearly polarized light may be transmitted through the first and second λ/4 phase retardation parts to be changed into circularly polarized light. On the contrary, the linearly polarized light may be transmitted directly to the display panel DP of FIG. 2 in an area in which the λ/4 phase retarder RC is not disposed (e.g., blue pixel area PX-B).

Referring to FIG. 7B, another exemplary embodiment of an optical member, an optical member PM-2, may further include a support layer BC disposed between the linear polarizer PP and the λ/4 phase retarder RC. The support layer BC may overlap with an entire bottom surface of the linear polarizer PP. In the exemplary embodiment of FIG. 7B, the λ/4 phase retarder RC may overlap with the green pixel area PX-G and the red pixel area PX-R of the display panel DP of FIG. 2.

In FIG. 7B, in an exemplary embodiment, the support layer BC may be a TAC layer or may be a base layer including a polymer material such as cyclo-olefin polymer ("COP"), cyclo-olefin co-polymer ("COC"), polycarbonate ("PC"), polyethyleneterephtalate ("PET"), polypropylene ("PP"), or plymethylmethacrylate ("PMMA"). The support layer BC may be a base layer that does not have optical anisotropy. Thus, in the optical member PM-2 of FIG. 7B, light transmitted through the λ/4 phase retarder RC may be changed into circularly polarized light, and linearly polarized light in area in which the λ/4 phase retarder RC is not disposed may be transmitted directly to the display panel DP (see FIG. 2), like the exemplary embodiment of the optical member PM illustrated in FIG. 2.

Still another exemplary embodiment of an optical member, an optical member PM-3, illustrated in FIG. 7C may further include a λ/2 phase retarder RC-H, when compared to the optical member PM illustrated in FIG. 2. The λ/2 phase retarder RC-H may be disposed between the linear polarizer PP and the λ/4 phase retarder RC.

The λ/2 phase retarder RC-H may be an optical layer that retards a phase of provided light by λ/2. In addition, the λ/2 phase retarder RC-H may change a polarization state of light provided into the λ/2 phase retarder RC-H. A polarization direction of linearly polarized light provided from the linear polarizer PP into the λ/2 phase retarder RC-H may be changed by the λ/2 phase retarder RC-H.

The λ/2 phase retarder RC-H may be a liquid crystal coating layer. The λ/2 phase retarder RC-H may be the liquid crystal coating layer made of a reactive liquid crystal monomer. The reactive liquid crystal monomers may be formed and aligned by a coating process, and then, a polymerization process may be performed on the coated reactive liquid crystal monomers to form the λ/2 phase retarder RC-H. The λ/2 phase retarder RC-H may consist of only the liquid crystal coating layer without a base material corresponding to a supporter.

Thus, in the optical member PM-3 of FIG. 7C, light sequentially passing through the λ/2 phase retarder RC-H and the λ/4 phase retarder RC may be changed into circularly polarized light, and linearly polarized light in area in which the λ/2 phase retarder RC-H and the λ/4 phase retarder RC are not disposed may be transmitted directly to the display panel DP (see FIG. 2), like the exemplary embodiment of the optical member PM illustrated in FIG. 2.

However, exemplary embodiments of the optical member PM according to the invention are not limited to the exemplary embodiments illustrated in FIGS. 2 and 7A to 7C. For example, in another exemplary embodiment of the optical member PM-1 of FIG. 7A, the λ/2 phase retarder RC-H may further be disposed between the linear polarizer PP and the λ/4 phase retarder RC. In still another exemplary embodiment, the optical member PM-3 of FIG. 7C may further include the support layer BC disposed between the linear polarizer PP and the λ/2 phase retarder RC-H.

In an exemplary embodiment of the display apparatus including one of the optical members illustrated in FIGS. 7A to 7C, the optical member corresponding to the blue pixel area includes only the linear polarizer without the phase retarder, and thus the reflectance difference of the external light between the pixel areas may be reduced to improve the display quality of the display apparatus.

Figure 8:
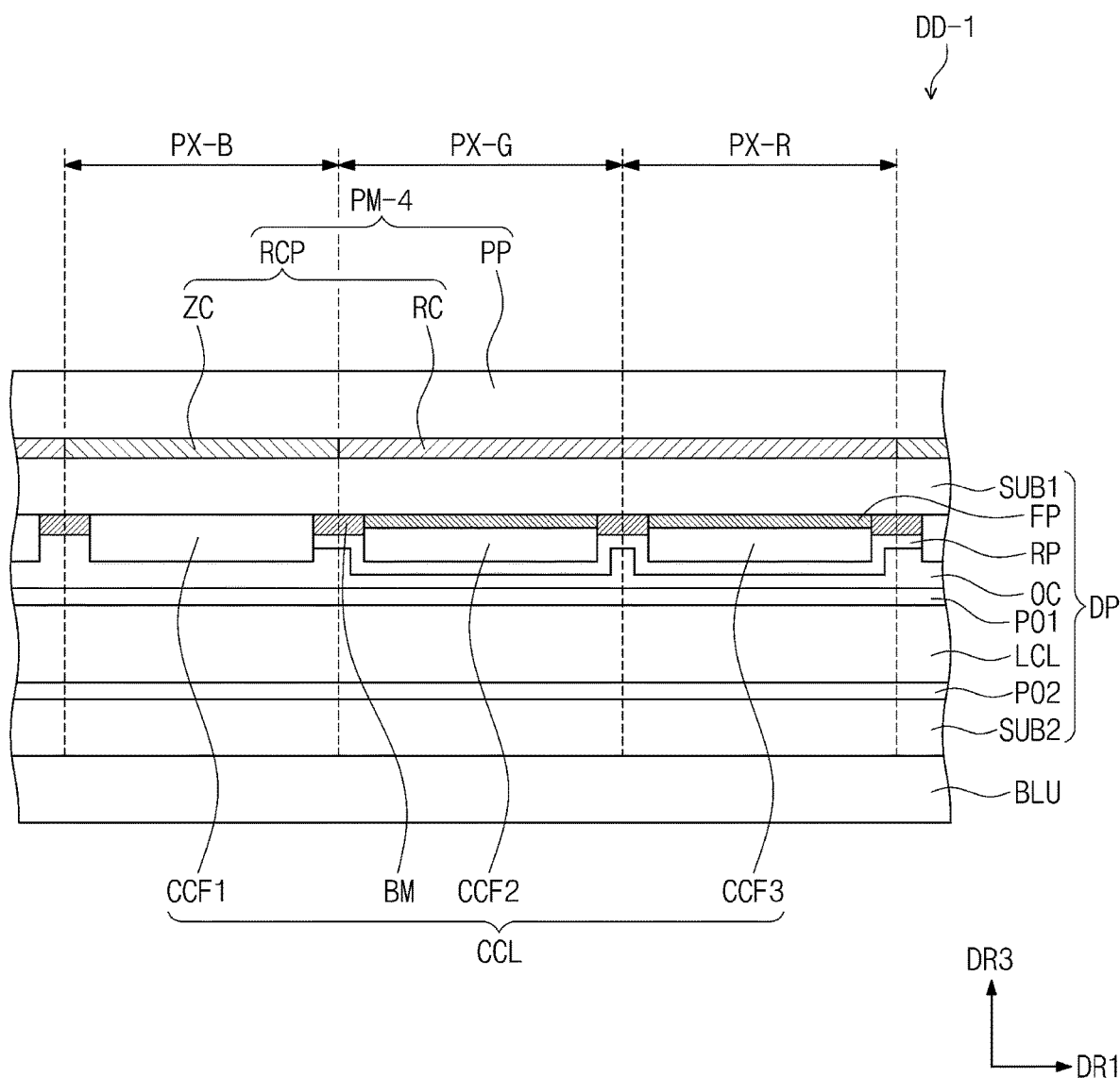
FIG. 8 is a cross-sectional view illustrating an exemplary embodiment of a display apparatus according to the invention.

FIG. 8 is a cross-sectional view illustrating a display apparatus DD-1 according to the invention. In the exemplary embodiment of FIG. 8, the descriptions to the same components as in the exemplary embodiments of FIGS. 1 to 6 will be omitted or mentioned briefly for the purpose of ease and convenience in description. In other words, differences between this exemplary embodiment and the above exemplary embodiments will be mainly described hereinafter.

The display apparatus DD-1 according to the invention may include a light source unit BLU, a display panel DP disposed on the light source unit BLU, and an optical member PM-4 disposed on the display panel DP. The optical member PM-4 of the display apparatus DD-1 illustrated in FIG. 8 may further include a zero phase retarder ZC compared to the optical member PM of the display apparatus DD illustrated in FIG. 2.

In the display apparatus DD-1 of FIG. 8, the display panel DP may include a first polarizing layer PO1, a reflective layer RP, a color conversion layer CCL and a first substrate SUB1 which are sequentially stacked on a liquid crystal layer LCL. In addition, the display panel DP may also include a second polarizing layer PO2 and a second substrate SUB2 which are sequentially stacked on a bottom surface of the liquid crystal layer LCL in a direction toward the light source unit BLU.

The second polarizing layer PO2 of the display apparatus DD-1 of FIG. 8 is an in-cell type polarizer disposed between the liquid crystal layer LCL and the second substrate SUB2, unlike the second polarizing layer PO2 of the display apparatus DD illustrated in FIG. 2. However, the invention is not limited thereto. In certain exemplary embodiments, the second polarizing layer PO2 may be disposed between the second substrate SUB2 and the light source unit BLU in the display apparatus DD-1.

The color conversion layer CCL included in the display panel DP may include first to third conversion parts CCF1, CCF2, and CCF3 and a light shielding part BM disposed between the first to third conversion parts CCF1, CCF2, and CCF3. The display panel DP may include the reflective layer RP which overlaps with the second and third conversion parts CCF2 and CCF3 and is disposed between the second conversion part CCF2 and the first polarizing layer PO1 and between the third conversion part CCF3 and the first polarizing layer PO1. In addition, the display panel DP may further include an optical filter layer FP which overlaps with the second and third conversion parts CCF2 and CCF3 and is disposed between the second conversion part CCF2 and the first substrate SUB1 and between the third conversion part CCF3 and the first substrate SUB1.

In the display apparatus DD-1 according to the invention, the optical member PM-4 may be disposed on the display panel DP. The optical member PM-4 may be disposed on a top surface of the first substrate SUB1.

The optical member PM-4 may include a linear polarizer PP, and λ/4 phase retarder RC and the zero phase retarder ZC disposed between the linear polarizer PP and the first substrate SUB1. The zero phase retarder ZC may be disposed adjacent to the λ/4 phase retarder RC when viewed in a plan view. The zero phase retarder ZC may overlap with the blue pixel area PX-B in the third direction DR3 corresponding to a thickness direction of the display apparatus DD-1. In other words, the zero phase retarder ZC may be disposed between the linear polarizer PP and the display panel DP, and may overlap with the first conversion part CCF1.

The zero phase retarder ZC may overlap with the blue pixel area PX-B and may not overlap with the green pixel area PX-G and the red pixel area PX-R. The λ/4 phase retarder RC may not overlap with the blue pixel area PX-B and may overlap with the green pixel area PX-G and the red pixel area PX-R.

The zero phase retarder ZC may include an optically isotropic material of which a phase retardation value is zero. In an exemplary embodiment, for example, the zero phase retarder ZC may be a TAC layer or may be a polymer resin formed of a polymer material such as COP, (COC), PC, PET, PP, or PMMA.

In other words, the display apparatus DD-1 of the exemplary embodiment illustrated in FIG. 8 may include a patterned phase retarder RCP disposed on the display panel DP and the linear polarizer PP disposed on the patterned phase retarder RCP. The patterned phase retarder RCP may include a first phase retardation part overlapping with the green and red pixel areas PX-G and PX-R, not overlapping with the blue pixel area PX-B, and having a phase retardation value of λ/4 and a second phase retardation part overlapping with the blue pixel area PX-B, not overlapping with the green and red pixel areas PX-G and PX-R, and having a phase retardation value of zero. In the exemplary embodiment of FIG. 8, the first phase retardation part may be the λ/4 phase retarder RC, and the second phase retardation part may be the zero phase retarder ZC.

In an exemplary embodiment, the λ/4 phase retarder RC may overlap with the reflective layer RP, and the zero phase retarder ZC may not overlap with the reflective layer RP.

In the display apparatus DD-1 of FIG. 8, the display panel DP includes the reflective layer RP which overlaps with the green and red pixel areas PX-G and PX-R but does not overlap with the blue pixel area PX-B. Thus, external light outside the display apparatus DD-1 may pass through the optical member PM-4 and may then be reflected at the reflective layer RP in the green and red pixel areas PX-G and PX-R. In this case, the external light transmitted through the optical member PM-4 may be changed into circularly polarized light while passing through the linear polarizer PP and the λ/4 phase retarder RC. Thereafter, the circularly polarized light may be reflected at the reflective layer RP, and thus the circular polarization state of the light may be changed into an opposite circular polarization state. The light in the opposite circular polarization state may pass through the λ/4 phase retarder RC to be converted into light in a linear polarization state of which polarization direction is perpendicular to the polarization direction of the external light passed through the linear polarizer PP. As a result, the external light reflected at the reflective layer RP does not pass through the linear polarizer PP, and thus reflection of the external light can be blocked. That is, the external light incident to the green and red pixel areas PX-G and PX-R does not exit to the outside of the display apparatus DD-1.

On the other hand, since the reflective layer RP is not disposed in the blue pixel area PX-B, the reflection of the external light occurs at the first polarizing layer PO1 which corresponds to the blue pixel area PX-B. In this case, the external light transmitted through the linear polarizer PP and the zero phase retarder ZC may be changed into linearly polarized light, and the linearly polarized light may be reflected at the first polarizing layer PO1 to be changed into light in a linear polarization state of which polarization direction is perpendicular to the polarization direction of the light which is right before reflected at the first polarizing layer PO1. The light reflected at the first polarizing layer PO1 may be provided back to the optical member PM-4 including the linear polarizer PP and the zero phase retarder ZC. As a result, the external light reflected at the first polarizing layer PO1 does not pass through the linear polarizer PP, and thus reflection of the external light can be blocked. That is, the external light incident to the blue pixel area PX-B does not exit to the outside of the display apparatus DD-1.

Therefore, in the display apparatus according to this exemplary embodiment, the zero phase retarder is disposed in the blue pixel area and the λ/4 phase retarder is disposed in the portion corresponding to the green pixel area and the red pixel area. As a result, it is possible to reduce or minimize a reflectance difference of external light between the area having the reflective layer and the area not having the reflective layer. In other words, an exemplary embodiment of the display apparatus according to the invention may use the optical member which includes the patterned phase retarder having different phase retardation values in the portion corresponding the green and red pixel areas and the portion corresponding to the blue pixel area, thereby reducing or minimizing the reflectance difference of the external light between the pixel areas.

Figure 9A:
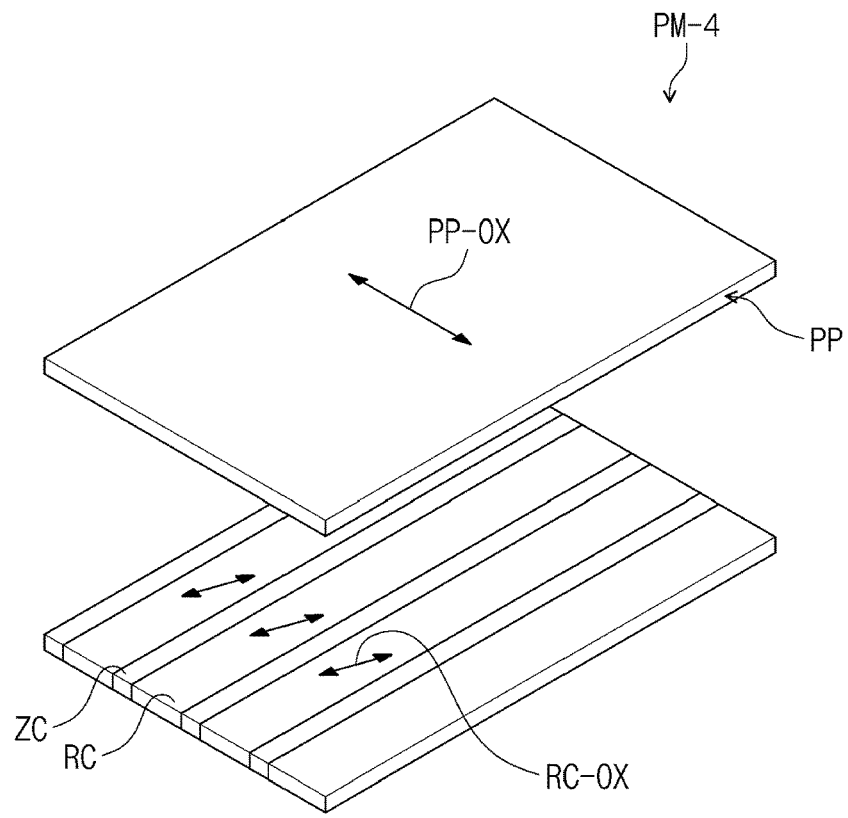
FIG. 9A is an exploded perspective view illustrating an exemplary embodiment of an optical member included in a display apparatus according to the invention.
Figure 9B:
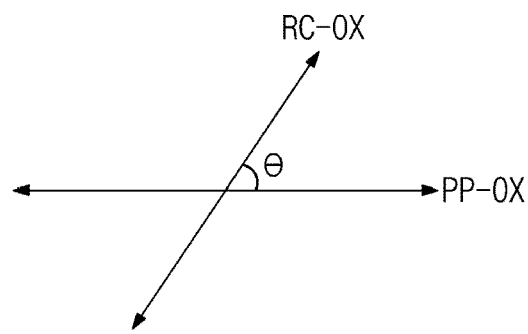
FIG. 9B is a schematic diagram illustrating an exemplary embodiment of relation between optical axes of a linear polarizer and a phase retarder included in an optical member according to the invention.

FIG. 9A is an exploded perspective view schematically illustrating an exemplary embodiment of the optical member PM-4 included in the display apparatus DD-1 illustrated in FIG. 8. FIG. 9B is a schematic diagram illustrating an exemplary embodiment of relation between optical axes of the linear polarizer PP and the λ/4 phase retarder RC included in the optical member PM-4 illustrated in FIG. 9A.

Referring to FIG. 9A, the zero phase retarder ZC and the λ/4 phase retarder RC may extend in one direction. In addition, the zero phase retarder ZC and the λ/4 phase retarder RC may be alternately and repeatedly arranged in another direction substantially perpendicular to the one direction. For example, as illustrated in FIG. 9A, the zero phase retarder ZC and the λ/4 phase retarder RC may extend in the second direction DR2 and may be alternately and repeatedly arranged in the first direction DR1. The zero phase retarder ZC and the λ/4 phase retarder RC may have stripe shapes extending in the second direction DR2.

In other words, in an exemplary embodiment, the optical member PM-4 may include the linear polarizer PP and the patterned phase retarder RCP that is disposed on a bottom surface of the linear polarizer PP and has the zero phase retarder ZC and the λ/4 phase retarder RC alternately arranged. In this case, the zero phase retarder ZC may overlap with the blue pixel area PX-B, and the λ/4 phase retarder RC may overlap with the green pixel area PX-G and the red pixel area PX-R.

FIG. 9B illustrates the relation of a transmission axis PP-OX of the linear polarizer PP and an optical axis RC-OX of the λ/4 phase retarder RC in a plan view. In other words, FIG. 9B illustrates the relation of the transmission axis PP-OX of the linear polarizer PP and the optical axis RC-OX of the λ/4 phase retarder RC on a plane, defined by the axis of the first direction DR1 and the axis of the second direction DR2, on which the transmission axis PP-OX and the optical axis RC-OX are projected. In an exemplary embodiment, for example, the plane defined by the axis of the first direction DR1 and the axis of the second direction DR2 in FIG. 9B may be parallel to the display panel DP of FIG. 8. In an exemplary embodiment, the optical axis RC-OX of the λ/4 phase retarder RC may show a slow axis.

In the plane illustrated in FIG. 9B, an angle θ between the transmission axis PP-OX of the linear polarizer PP and the optical axis RC-OX of the λ/4 phase retarder RC may be about 45 degrees. In other words, in an exemplary embodiment, the transmission axis PP-OX of the linear polarizer PP may be parallel to the axis of the first direction DR1, and the optical axis RC-OX of the λ/4 phase retarder may form the angle of 45 degrees with respect to the axis of the first direction DR1. However, the invention is not limited thereto. In another exemplary embodiment, the transmission axis PP-OX of the linear polarizer PP may not be parallel to the axis of the first direction DR1.

Figure 10:
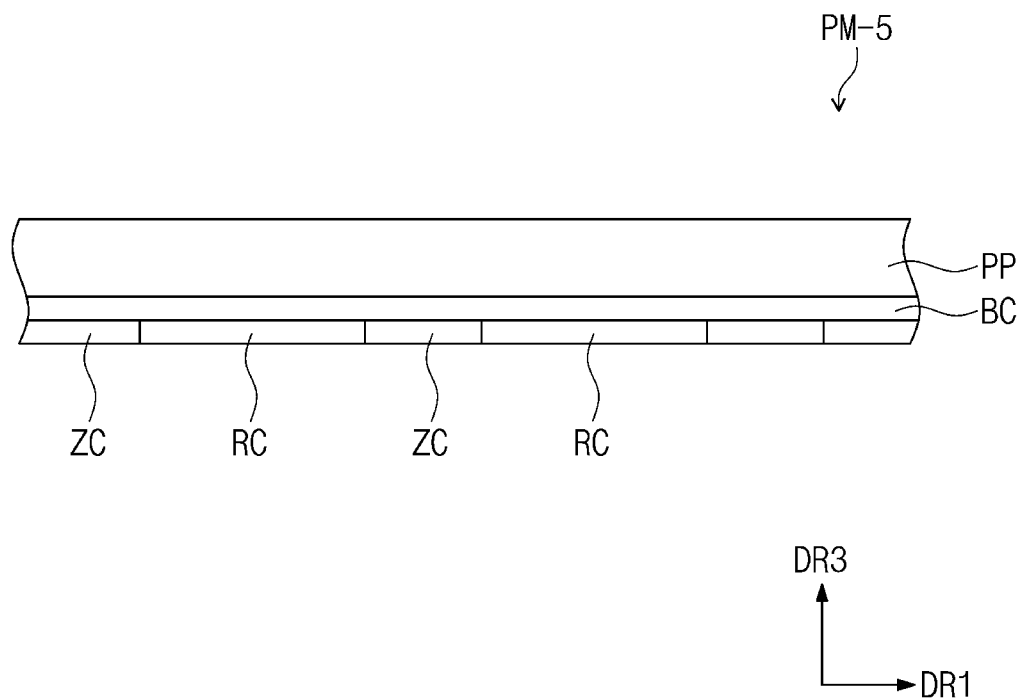
FIG. 10 is a cross-sectional view illustrating an optical member included in a display apparatus according to an exemplary embodiment of the invention.

FIG. 10 is a cross-sectional view illustrating another exemplary embodiment of an optical member included in the display apparatus DD-1 illustrated in FIG. 8. An optical member PM-5 of FIG. 10 may further include a support layer BC compared to the optical member PM-4 of FIG. 8.

The support layer BC may be disposed on the bottom surface of the linear polarizer PP. The support layer BC may be disposed between the linear polarizer PP and the zero phase retarder ZC and between the linear polarizer PP and the λ/4 phase retarder RC. In an exemplary embodiment, the support layer BC may be a TAC layer or may be a base layer including a polymer material such as COP, COC, PC, PET, PP, or PMMA. The support layer BC may be a base layer that does not have optical anisotropy.

Figure 11:
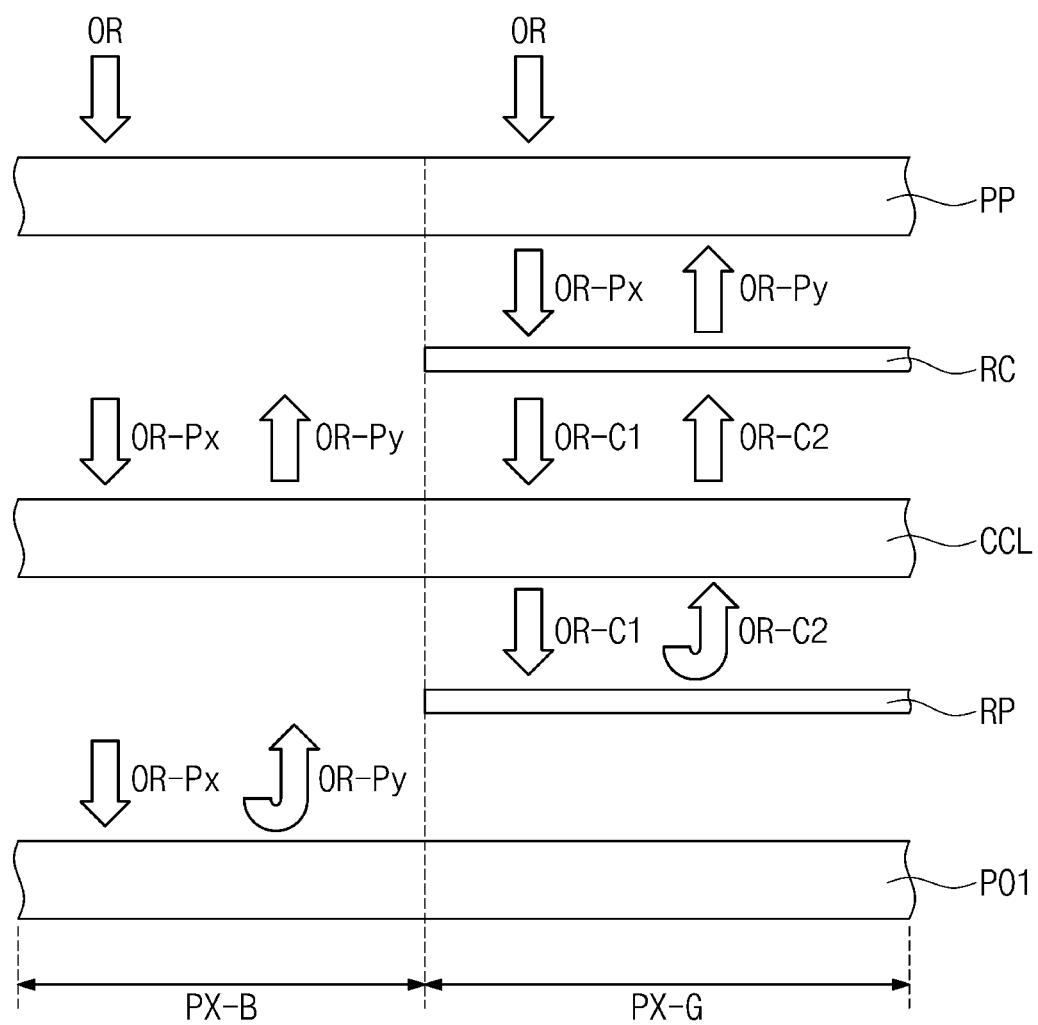
FIG. 11 is a schematic diagram illustrating an exemplar embodiment of characteristics change of external light provided to a display apparatus according to the invention.

FIG. 11 is a schematic diagram illustrating an exemplary embodiment of a state change of light as the external light OR passes through the optical layers of the optical member and the display panel in the display apparatus DD illustrated in FIG. 2. FIG. 11 schematically illustrates a state change of light when the external light OR is provided into the linear polarizer PP, the λ/4 phase retarder RC, the color conversion layer CCL, the reflective layer RP, and the first polarizing layer PO1.

In FIG. 11, the blue pixel area PX-B is compared with the green pixel area PX-G. However, a state change of light in the red pixel area PX-R may be substantially the same as a state change of light in the green pixel area PX-G.

Referring to FIG. 11, in the blue pixel area PX-B, the external light OR passes through the linear polarizer PP to be changed into first linearly polarized light OR-Px polarized in one direction, and then, the first linearly polarized light OR-Px is provided to the color conversion layer CCL.

After passing through the color conversion layer CCL, the first linearly polarized light OR-Px is provided to the first polarizing layer PO1 and is reflected at the first polarizing layer PO1. The transmission axis of the first polarizing layer PO1 may be parallel to the transmission axis of the linear polarizer PP. In addition, since the first polarizing layer PO1 is the reflective polarizer, the first polarizing layer PO1 may reflect light of a polarization direction perpendicular to the transmission axis thereof. Thus, the first linearly polarized light OR-Px reflected by the first polarizing layer PO1 may be changed into second linearly polarized light OR-Py that has a polarization direction perpendicular to that of the first linearly polarized light OR-Px. The second linearly polarized light OR-Py reflected from the first polarizing layer PO1 passes through the color conversion layer CCL again and then is provided to the linear polarizer PP. In this case, an oscillating direction of the second linearly polarized light OR-Py is perpendicular to the transmission axis of the linear polarizer PP, and thus the second linearly polarized light OR-Py does not pass through the linear polarizer PP. As a result, the light reflected at the first polarizing layer PO1 is not outputted to the outside, and thus the reflection of the external light can be reduced or minimized in the blue pixel area PX-B.

In the green pixel area PX-G illustrated in FIG. 11, the external light OR passes through the linear polarizer PP to be changed into the first linearly polarized light OR-Px polarized in the one direction, and then, the first linearly polarized light OR-Px is provided to the λ/4 phase retarder RC. The first linearly polarized light OR-Px is transmitted through the λ/4 phase retarder RC to be changed into first circularly polarized light OR-C1, and the first circularly polarized light OR-C1 is provided to the color conversion layer CCL. After passing the color conversion layer CCL, the first circularly polarized light OR-C1 is provided to the reflective layer RP and is reflected at the reflective layer RP. The first circularly polarized light OR-C1 reflected at the reflective layer RP may be changed into second circularly polarized light OR-C2 of which a polarization direction is changed. The second circularly polarized light OR-C2 reflected from the reflective layer RP passes through the color conversion layer CCL again and then is provided to the λ/4 phase retarder RC. The second circularly polarized light OR-C2 may be changed back into linearly polarized light in the λ/4 phase retarder RC. In other words, the second circularly polarized light OR-C2 passes through the λ/4 phase retarder RC to be changed into second linearly polarized light OR-Py, and the second linearly polarized light OR-Py is provided to the linear polarizer PP. In this case, an oscillating direction of the second linearly polarized light OR-Py is perpendicular to the transmission axis of the linear polarizer PP, and thus the second linearly polarized light OR-Py does not pass through the linear polarizer PP. As a result, the light reflected at the reflective layer RP is not outputted to the outside, and thus the reflection of the external light can be reduced or minimized in the green pixel area PX-G. This phenomenon can also be applied to the red pixel area PX-R (see FIG. 2).

The display apparatus according to the invention may include the phase retarder overlapping with only some of the pixel areas of the display panel, thereby reducing or minimizing the reflectance difference of external light between the pixel areas. In the display apparatus according to the invention, the λ/4 phase retarder overlapping with the green and red pixel areas but not overlapping with the blue pixel area may be disposed on the display panel to reduce the reflectance of external light of the display apparatus.

In other words, the display apparatus according to the invention may include the optical member which is disposed on the display panel and includes the patterned phase retarder having the phase retardation value of zero in the blue pixel area and the phase retardation value of λ/4 in the green and red pixel areas, and thus the display quality of the display apparatus can be improved by reducing the reflectance difference of external light between the pixel areas.

The display apparatus according to the invention may use the phase retarder of an anti-reflection optical member, which is patterned to correspond to the pixel areas of the display panel. Thus, the display quality of the display apparatus may be improved by reducing the reflectance difference of external light between the pixel areas.

While the invention has been described with reference to exemplary embodiments, it will be apparent to those skilled in the art that various changes and modifications may be made without departing from the spirits and scopes of the invention. Therefore, it should be understood that the above exemplary embodiments are not limiting, but illustrative. Thus, the scopes of the invention are to be determined by the broadest permissible interpretation of the following claims and their equivalents, and shall not be restricted or limited by the foregoing description.

What is claimed is:

1. A display apparatus comprising:
   a light source unit which provides blue light;
   a display panel disposed on the light source unit and which comprises a blue pixel area, a green pixel area, and a red pixel area; and
   an optical member disposed on the display panel,
   wherein the display panel comprises:
   a first substrate;
   a second substrate which faces the first substrate and is closer to the light source unit than the first substrate;
   a liquid crystal layer disposed between the first substrate and the second substrate;
   a first polarizing layer disposed between the first substrate and the liquid crystal layer;
   a second polarizing layer which faces the first polarizing layer and is closer to the light source unit than the first polarizing layer;
   a color conversion layer disposed between the first substrate and the first polarizing layer; and
   a reflective layer disposed between the color conversion layer and the first polarizing layer,
   wherein the optical member comprises:
   a linear polarizer; and
   a λ/4 phase retarder disposed between the linear polarizer and the first substrate, and which overlaps with the green pixel area and the red pixel area, and does not overlaps with the blue pixel area in a plan view.

2. The display apparatus of claim 1, wherein the reflective layer overlaps with the green pixel area and the red pixel area and does not overlap with the blue pixel area.

3. The display apparatus of claim 1, wherein the color conversion layer comprises:
   a first conversion part disposed on the blue pixel area and which transmits the blue light;
   a second conversion part disposed on the green pixel area and which includes a first illuminant which absorbs the blue light and emits green light; and
   a third conversion part disposed on the red pixel area and which includes a second illuminant which absorbs the blue light and emits red light.

4. The display apparatus of claim 3, wherein the first illuminant and the second illuminant include at least one of a fluorescent substance and a quantum dot.

5. The display apparatus of claim 3, wherein a particle size of the first illuminant is different from a particle size of the second illuminant.

6. The display apparatus of claim 3, wherein the first to third conversion parts are spaced apart from each other in the plan view, and
wherein the color conversion layer further comprises a light shielding part disposed between the first to third conversion parts.

7. The display apparatus of claim 3, wherein the display panel further comprises:
an optical filter layer disposed between the second conversion part and the first substrate and between the third conversion part and the first substrate.

8. The display apparatus of claim 1, wherein the optical member further comprises:
a support layer disposed between the linear polarizer and the $\lambda/4$ phase retarder.

9. The display apparatus of claim 1, wherein the optical member further comprises:
a $\lambda/2$ phase retarder disposed between the linear polarizer and the $\lambda/4$ phase retarder.

10. The display apparatus of claim 1, wherein the first polarizing layer is a reflective polarizer that transmits light polarized in a first direction and reflects light polarized in a second direction perpendicular to the first direction.

11. The display apparatus of claim 10, wherein the first polarizing layer is a wire grid polarizer.

12. The display apparatus of claim 10, wherein the linear polarizer has a transmission axis parallel to the first direction.

13. The display apparatus of claim 1, wherein the optical member further comprises:
a zero phase retarder disposed adjacent to the $\lambda/4$ phase retarder in the plan view and which overlaps with the blue pixel area.

14. The display apparatus of claim 13, wherein the optical member further comprises:
a support layer disposed between the linear polarizer and the $\lambda/4$ phase retarder and between the linear polarizer and the zero phase retarder.

15. The display apparatus of claim 1, wherein the second polarizing layer is disposed on a top surface or a bottom surface of the second substrate.

16. The display apparatus of claim 1, wherein the $\lambda/4$ phase retarder is a liquid crystal coating layer.

17. A display apparatus comprising:
a light source unit;
a display panel disposed on the light source unit and which comprises a blue pixel area, a green pixel area, and a red pixel area; and
an optical member disposed on the display panel,
wherein the display panel comprises:
a first substrate;
a second substrate which faces the first substrate and is closer to the light source unit than the first substrate;
a liquid crystal layer disposed between the first substrate and the second substrate;
a first polarizing layer disposed between the first substrate and the liquid crystal layer;
a second polarizing layer which faces the first polarizing layer and is closer to the light source unit than the first polarizing layer;
a color conversion layer disposed between the first substrate and the first polarizing layer; and
a reflective layer disposed between the color conversion layer and the first polarizing layer,
wherein the optical member comprises:
a patterned phase retarder; and
a linear polarizer disposed on the patterned phase retarder,
wherein the patterned phase retarder comprises:
a first phase retardation part which overlaps with the green pixel area and the red pixel area, does not overlap with the blue pixel area in a plan view, and has a phase retardation value of $\lambda/4$; and
a second phase retardation part which overlaps with the blue pixel area, does not overlap with the green pixel area and the red pixel area, and has a phase retardation value of zero.

18. The display apparatus of claim 17, wherein the reflective layer overlaps with the green pixel area and the red pixel area and does not overlap with the blue pixel area, and
wherein the reflective layer reflects green light and red light.

19. The display apparatus of claim 17, wherein the first polarizing layer is a reflective polarizer which transmits light polarized in a first direction and reflects light polarized in a second direction perpendicular to the first direction.

20. A display apparatus comprising:
a light source unit;
a display panel disposed on the light source unit and which comprises a first pixel area, a second pixel area and a third pixel area which emit light of different wavelengths from each other; and
an optical member disposed on the display panel,
wherein the display panel comprises:
a first substrate;
a second substrate which faces the first substrate and is closer to the light source unit than the first substrate;
a liquid crystal layer disposed between the first substrate and the second substrate;
a first polarizing layer disposed between the first substrate and the liquid crystal layer;
a second polarizing layer which faces the first polarizing layer and is closer to the light source unit than the first polarizing layer;
a color conversion layer disposed between the first substrate and the first polarizing layer; and
a reflective layer which is disposed between the color conversion layer and the first polarizing layer, overlaps with the second and third pixel areas, and does not overlap with the first pixel area in a plan view,
wherein the optical member comprises:
a linear polarizer;
a $\lambda/4$ phase retarder which is disposed between the linear polarizer and the first substrate, overlaps with the reflective layer, and does not overlap with the first pixel area; and
a zero phase retarder which is disposed between the linear polarizer and the first substrate and does not overlap with the reflective layer.

* * * * *